United States Patent
Mohan et al.

(10) Patent No.: US 12,019,584 B1
(45) Date of Patent: Jun. 25, 2024

(54) METHODS AND APPARATUS FOR CREATING AND UTILIZING SNAPSHOTS OF SCENES

(71) Applicant: Nuro, Inc., Mountain View, CA (US)

(72) Inventors: Varun Krish Mohan, San Jose, CA (US); Anshul Asawa Ramachandran, Cupertino, CA (US)

(73) Assignee: NURO, INC., Mountain View, CA (US)

( * ) Notice: Subject to any disclaimer, the term of this patent is extended or adjusted under 35 U.S.C. 154(b) by 46 days.

(21) Appl. No.: 17/525,429

(22) Filed: Nov. 12, 2021

Related U.S. Application Data

(60) Provisional application No. 63/121,033, filed on Dec. 3, 2020.

(51) Int. Cl.
G06F 16/11 (2019.01)
G06F 16/14 (2019.01)

(52) U.S. Cl.
CPC .......... *G06F 16/128* (2019.01); *G06F 16/148* (2019.01)

(58) Field of Classification Search
CPC .............................. G06F 16/148; G06F 16/128
USPC .......................................................... 707/639
See application file for complete search history.

(56) References Cited

U.S. PATENT DOCUMENTS

| | | | |
|---|---|---|---|
| 10,496,494 B1 * | 12/2019 | Haloi | G06F 16/148 |
| 10,788,841 B2 | 9/2020 | Zhang et al. | |
| 10,796,572 B2 | 10/2020 | Farr et al. | |
| 2019/0072959 A1 * | 3/2019 | Palanisamy | G05D 1/021 |
| 2021/0024096 A1 | 1/2021 | Wang et al. | |
| 2021/0334289 A1 * | 10/2021 | Banerjee | G06V 40/18 |

OTHER PUBLICATIONS

Lex Fridman et al., "Automated Synchronization of Driving Data Using Vibration and Steering Events", www.elsevier.com, arXiv:1510.06113v2 [cs.RO], Mar. 1, 2016, 8 pages.

* cited by examiner

*Primary Examiner* — Robert W Beausoliel, Jr.
*Assistant Examiner* — Lauren Zannah Ganger
(74) *Attorney, Agent, or Firm* — Edell, Shapiro & Finnan, LLC

(57) ABSTRACT

According to one aspect, data collected from various modules on an autonomous vehicle is synchronized, and snapshots of the synchronized data, referred to herein as 'data snapshots', are created. Contextual information associated with the data snapshots, e.g., indexes and/or metadata, is collected and/or derived, and the contextual information is stored along with the snapshots. The data snapshots may then be substantially searched, using the contextual information, to identify particular scenes for analysis. In addition to searching for particular scenes, series of scenes may be searched using the contextual information such that scenarios encountered by the autonomous vehicle over time may be identified.

20 Claims, 15 Drawing Sheets

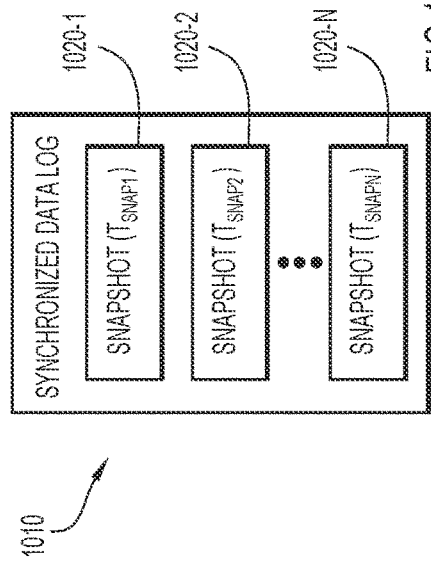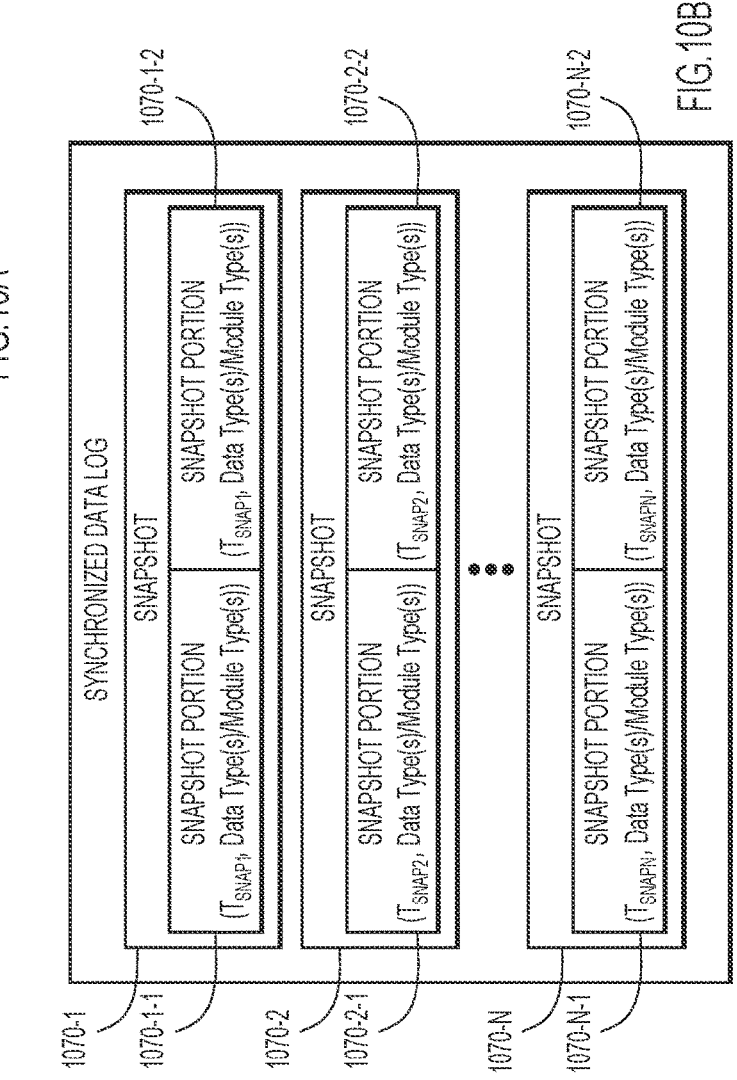

METHODS AND APPARATUS FOR CREATING AND UTILIZING SNAPSHOTS OF SCENES

CROSS-REFERENCE TO RELATED APPLICATION

This application claims priority to U.S. Provisional Application No. 63/121,033, filed Dec. 3, 2020, the entirety of which is incorporated herein by reference.

TECHNICAL FIELD

The disclosure relates to providing systems that support autonomous vehicles. More particularly, the disclosure relates to providing a system that may be used to identify scenes which may be analyzed or otherwise processed to increase the likelihood that an autonomous vehicle may operate safely.

BACKGROUND

As an autonomous vehicle drives, sensor systems on the autonomous vehicle collect data relating to the environment surrounding the autonomous vehicle and internal modules compute additional data that could be used to provide information regarding actions that the autonomous vehicle should take and/or to evaluate the response of autonomous vehicles to issues. Such data may be used to evaluate issues spotted in the environment, as well as to evaluate the response of the autonomous vehicle to issues. In many instances, because there may be a high volume of data, it is difficult to efficiently identify data corresponding to issues.

BRIEF DESCRIPTION OF THE DRAWINGS

The disclosure will be readily understood by the following detailed description in conjunction with the accompanying drawings in which:

FIGS. 10A and 10B are diagrammatic representations illustrating different techniques for storing data snapshots in a synchronized data log, in accordance with various embodiments.

DESCRIPTION OF EXAMPLE EMBODIMENTS

General Overview

Figure 1:
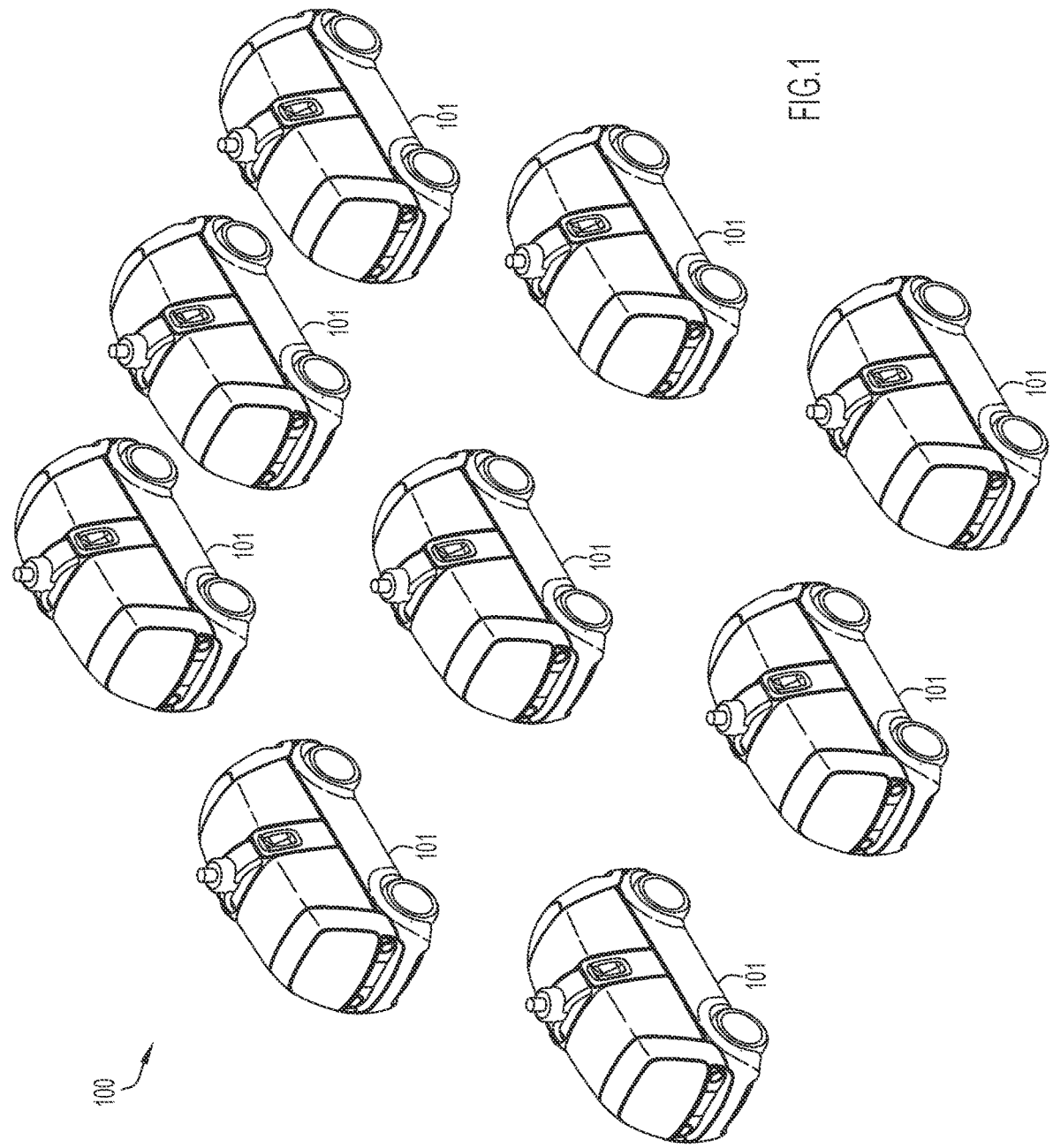
FIG. 1 is a diagrammatic representation of an autonomous vehicle fleet, in accordance with an embodiment.

In one embodiment, data collected from various modules on an autonomous vehicle is synchronized, and snapshots of the synchronized data, referred to herein as 'data snapshots', are created. Contextual information associated with the data snapshots, e.g., metadata and/or indexes, is collected and/or derived, and the contextual information is stored along with the snapshots. The snapshots may then be substantially searched, using the contextual information, to identify particular scenes for analysis. In addition to searching for particular scenes, series of scenes may be searched using the contextual information such that scenarios encountered by the autonomous vehicle over time may be identified.

In one embodiment, a computer-implemented method is provided that may include obtaining raw data from a plurality of data sources pertaining to operation of an autonomous vehicle in which the raw data is asynchronously obtained from the plurality of data sources and generating synchronized data by synchronizing the raw data asynchronously obtained from the plurality of data sources to a synchronization time. The method may further include creating, based on the synchronized data, a data snapshot for the synchronization time, wherein the data snapshot created for the synchronization time includes, at least in part, index information that identifies a data snapshot or a 'world state', as discussed in further detail herein, for the autonomous vehicle and the raw data obtained from the plurality of data sources. The method may further include storing the data snapshot in a synchronized data log. The world state for the autonomous vehicle represents the state of the world or environment surrounding and/or including the autonomous vehicle as viewed and/or perceived by the autonomous vehicle based on raw data obtained from various modules and/or derived data that is calculated/derived from the raw data obtained from various modules in which the raw/derived data is synchronized and stored in the synchronized data log. The method can be performed for multiple synchronization times, as raw data is collected/derived during operation of the autonomous vehicle in order to create and store a snapshot at each synchronization time, such that the data snapshots contained in the synchronization data log effectively represent a series of world states for the autonomous vehicle. The method can further include performing queries over the data snapshots by searching index information contained in the data snapshots in order to identify a scene or a scenario contained in the data snapshots.

Description

Autonomous vehicles, e.g., fully autonomous and/or semi-autonomous vehicles, typically collect a relatively large volume of data as they operate. The data may be collected from various systems of the vehicles including, but not limited to including, sensor systems and modules associated with autonomy systems. The large amount of data logged or otherwise collected from systems of an autonomous vehicle is dense, and it is often difficult and computationally-intensive to identify specific pieces of data in response to a query. For example, when it is desired to identify a specific issue or scene encountered by an autonomous vehicle, logs are searched for data from different systems, which may be time-consuming and expensive.

By synchronizing data from various systems of an autonomous vehicle, and creating data snapshots that effectively include data from the various systems, identifying an issue, scene, or scenario encountered by the autonomous vehicle may be more efficient. Further, storing contextual information with each snapshot of data facilitates searching for a scene (e.g., an instant, snapshot, or state) or a scenario (e.g., a series of scenes). Contextual information may include, but is not limited to including, metadata and/or index information associated with a data snapshot. The contextual information allows a scene or scenario to be readily identified, and reduces the amount of resources, e.g., computational resources, that may be needed to locate data associated with a scene or scenario in response to a query.

In one embodiment, the storage of contextual information with snapshots allows for series of snapshots to be searched. Generally, a "scene" may refer to a particular snapshot, whereas a "scenario" may refer to a series of snapshots. Thus, a series of snapshots may be associated with a scenario that occurs over time, e.g., how a vehicle reacts over time to a specific obstacle in a path of the vehicle. Such a series of data snapshots may be identified using contextual information associated with the data snapshots. In some instances, identifying a scenario that occurs over time facilitates an assessment of how the vehicle operated in, or in response to, the scenario. As referred to herein, the terms "snapshot of data," "data snapshot," and "snapshot" may be used interchangeably.

Autonomous vehicles which collect data that may be synchronized and stored as data snapshots, along with contextual information, may generally operate as part of a fleet of autonomous vehicles. Referring initially to FIG. 1, an autonomous vehicle fleet will be described in accordance with an embodiment. An autonomous vehicle fleet 100 includes a plurality of autonomous vehicles 101, or robot vehicles. Autonomous vehicles 101 are generally arranged to transport and/or to deliver cargo, items, and/or goods. Autonomous vehicles 101 may be fully autonomous and/or semi-autonomous vehicles. In general, each autonomous vehicle 101 may be a vehicle that is capable of travelling in a controlled manner for a period of time without intervention, e.g., without human intervention. As will be discussed in more detail below, each autonomous vehicle 101 may include a power system, a propulsion or conveyance system, a navigation module, a control system or controller, a communications system, a processor, and a sensor system.

Dispatching of autonomous vehicles 101 in autonomous vehicle fleet 100 may be coordinated by a fleet management module (not shown). The fleet management module may dispatch autonomous vehicles 101 for purposes of transporting, delivering, and/or retrieving goods or services in an unstructured open environment or a closed environment.

Figure 2:
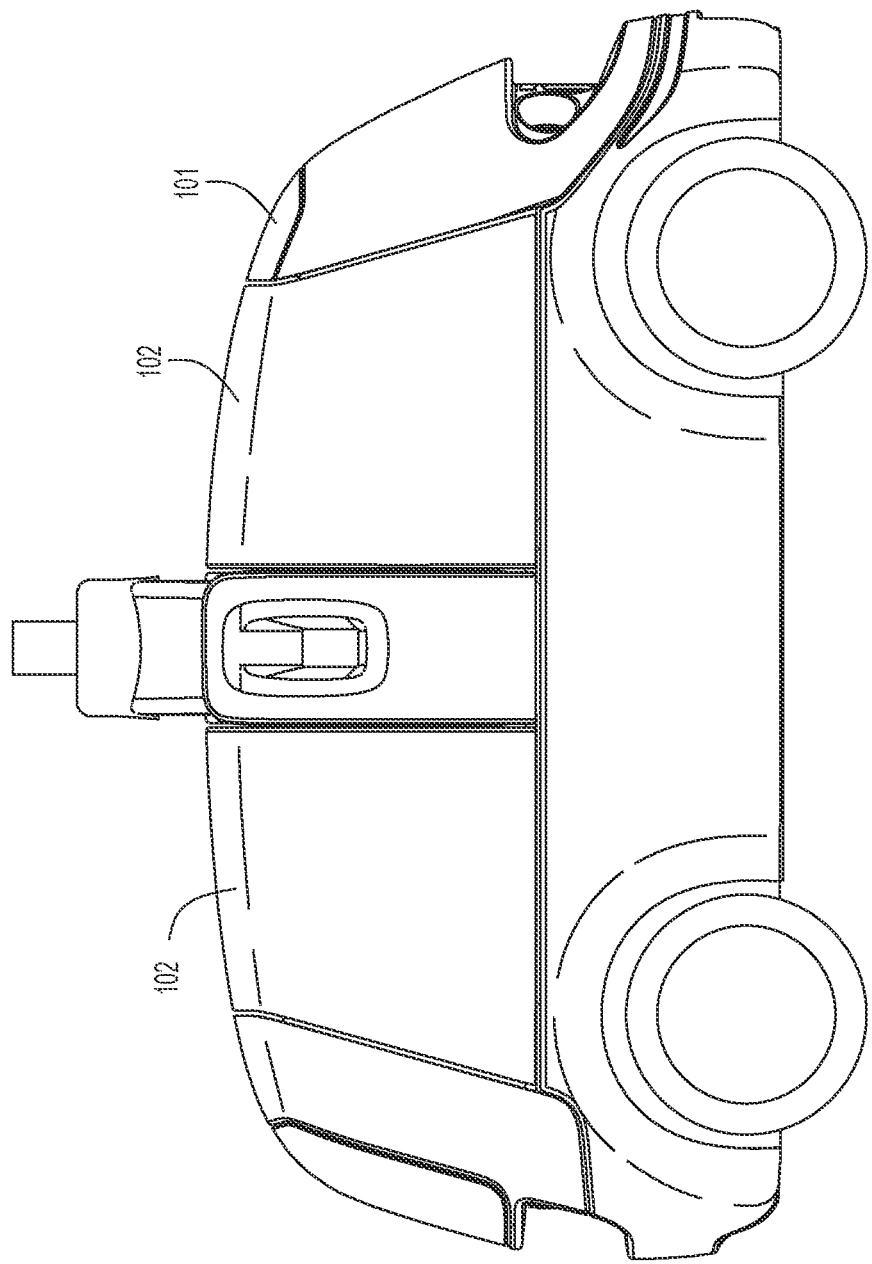
FIG. 2 is a diagrammatic representation of a side of an autonomous vehicle, in accordance with an embodiment.

FIG. 2 is a diagrammatic representation of a side of an autonomous vehicle, e.g., one of autonomous vehicles 101 of FIG. 1, in accordance with an embodiment. Autonomous vehicle 101, as shown, is a vehicle configured for land travel. Typically, autonomous vehicle 101 includes physical vehicle components such as a body or a chassis, as well as conveyance mechanisms, e.g., wheels. In one embodiment, autonomous vehicle 101 may be relatively narrow, e.g., approximately two to approximately five feet wide, and may have a relatively low mass and relatively low center of gravity for stability. Autonomous vehicle 101 may be arranged to have a working speed or velocity range of between approximately one and approximately forty-five miles per hour (mph), e.g., approximately twenty-five miles per hour. In some embodiments, autonomous vehicle 101 may have a substantially maximum speed or velocity in range between approximately thirty and approximately ninety mph.

In some instances, autonomous vehicle 101 may include a plurality of compartments 102. Compartments 102 may be assigned to one or more entities, such as one or more customer, retailers, and/or vendors. Compartments 102 are generally arranged to contain cargo, items, and/or goods. Typically, compartments 102 may be secure compartments. It should be appreciated that the number of compartments 102 may vary. That is, although two compartments 102 are shown, autonomous vehicle 101 is not limited to including two compartments 102. Although compartments 102 are noted with regard to autonomous vehicle 101, it is to be understood that an autonomous vehicle within the scope of embodiments herein may also not include compartments to contain cargo, items, goods, etc.

Figure 3:
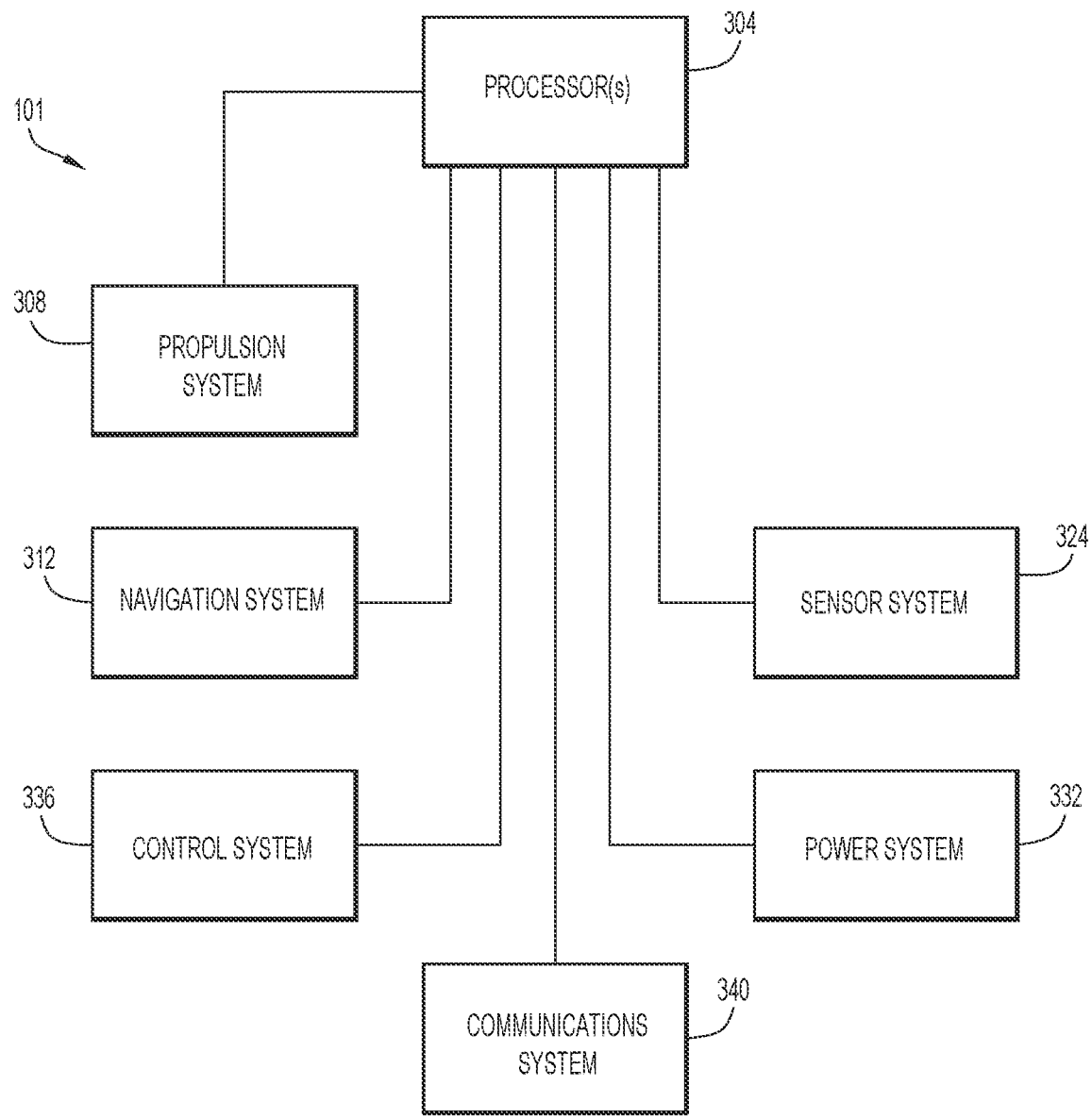
FIG. 3 is a block diagram representation of an autonomous vehicle, in accordance with an embodiment.

FIG. 3 is a block diagram representation of an autonomous vehicle, e.g., autonomous vehicle 101 of FIG. 1, in accordance with an embodiment. An autonomous vehicle 101 includes a processor 304, a propulsion system 308, a navigation system 312, a sensor system 324, a power system 332, a control system 336, and a communications system 340. It should be appreciated that processor 304, propulsion system 308, navigation system 312, sensor system 324, power system 332, and communications system 340 are all coupled to a chassis or body of autonomous vehicle 101.

Processor 304 is arranged to send instructions to and to receive instructions from or for various components such as propulsion system 308, navigation system 312, sensor system 324, power system 332, and control system 336. Propulsion system 308, or a conveyance system, is arranged to cause autonomous vehicle 101 to move, e.g., drive. For example, when autonomous vehicle 101 is configured with a multi-wheeled automotive configuration as well as steering, braking systems and an engine, propulsion system 308 may be arranged to cause the engine, wheels, steering, and braking systems to cooperate to drive. In general, propulsion system 308 may be configured as a drive system with a propulsion engine, wheels, treads, wings, rotors, blowers, rockets, propellers, brakes, etc. The propulsion engine may be a gas engine, a turbine engine, an electric motor, and/or a hybrid gas and electric engine.

Navigation system 312 may control propulsion system 308 to navigate autonomous vehicle 101 through paths and/or within unstructured open or closed environments. Navigation system 312 may include at least one of digital maps, street view photographs, and a global positioning system (GPS) point. Maps, for example, may be utilized in cooperation with sensors included in sensor system 324 to allow navigation system 312 to cause autonomous vehicle 101 to navigate through an environment.

Sensor system 324 includes any sensors, as for example LiDAR, radar, ultrasonic sensors, microphones, altimeters, and/or cameras. Sensor system 324 generally includes onboard sensors which allow autonomous vehicle 101 to safely navigate, and to ascertain when there are objects near autonomous vehicle 101. In one embodiment, sensor system 324 may include propulsion systems sensors that monitor drive mechanism performance, drive train performance, and/or power system levels.

Power system 332 is arranged to provide power to autonomous vehicle 101. Power may be provided as electrical power, gas power, or any other suitable power, e.g., solar power or battery power. In one embodiment, power system 332 may include a main power source, and an auxiliary power source that may serve to power various components of autonomous vehicle 101 and/or to generally provide power to autonomous vehicle 101 when the main power source does not does not have the capacity to provide sufficient power.

Communications system 340 allows autonomous vehicle 101 to communicate, as for example, wirelessly, with a fleet management system (not shown) that allows autonomous vehicle 101 to be controlled remotely. Communications system 340 generally obtains or receives data, stores the data, and transmits or provides the data to a fleet management system and/or to autonomous vehicles 101 within a fleet 100. The data may include, but is not limited to including, information relating to scheduled requests or orders, information relating to on-demand requests or orders, and/or information relating to a need for autonomous vehicle 101 to reposition itself, e.g., in response to an anticipated demand.

In some embodiments, control system 336 may cooperate with processor 304 to determine where autonomous vehicle 101 may safely travel, and to determine the presence of objects in a vicinity around autonomous vehicle 101 based on data, e.g., results, from sensor system 324. In other words, control system 336 may cooperate with processor 304 to effectively determine what autonomous vehicle 101 may do within its immediate surroundings. Control system 336 in cooperation with processor 304 may essentially control power system 332 and navigation system 312 as part of driving or conveying autonomous vehicle 101. Additionally, control system 336 may cooperate with processor 304 and communications system 340 to provide data to or obtain data from other autonomous vehicles 101, a management server, a global positioning server (GPS), a personal computer, a teleoperations system, a smartphone, or any computing device via the communication system 340. In general, control system 336 may cooperate at least with processor 304, propulsion system 308, navigation system 312, sensor system 324, and power system 332 to allow vehicle 101 to operate autonomously. That is, autonomous vehicle 101 is able to operate autonomously through the use of an autonomy system that effectively includes, at least in part, functionality provided by propulsion system 308, navigation system 312, sensor system 324, power system 332, and control system 336. Additional functionality provided by control system 336, propulsion system 308, navigation system 312, sensor system 324, and power system 332 may include, but is not limited to including, perception, localization, prediction, planner, and machine learning functionality.

As will be appreciated by those skilled in the art, when autonomous vehicle 101 operates autonomously, vehicle 101 may generally operate, e.g., drive, under the control of an autonomy system. That is, when autonomous vehicle 101 is in an autonomous mode, autonomous vehicle 101 is able to generally operate without a driver or a remote operator controlling autonomous vehicle. In one embodiment, autonomous vehicle 101 may operate in a semi-autonomous mode or a fully autonomous mode. When autonomous vehicle 101 operates in a semi-autonomous mode, autonomous vehicle 101 may operate autonomously at times and may operate under the control of a driver or a remote operator at other times. When autonomous vehicle 101 operates in a fully autonomous mode, autonomous vehicle 101 typically operates substantially only under the control of an autonomy system. The ability of an autonomous system to collect information and extract relevant knowledge from the environment provides autonomous vehicle 101 with perception capabilities. For example, data or information obtained from sensor system 324 may be processed such that the environment around autonomous vehicle 101 may effectively be perceived.

Autonomous vehicle 101 may generally collect information as it drives or otherwise operates, as for example while operating in an autonomous mode. The information may be logged or otherwise stored such that the information may be accessed at a later time. The information, or data, may be accessed to identify scenes and/or scenarios encountered by autonomous vehicle 101. Once identified, scenes and/or scenarios may be analyzed and/or processed to ascertain whether autonomous vehicle 101 exhibited appropriate behavior, as well as to provide benchmarking information, e.g., to assess actions taken by a tele-operator in a situation by comparing the actions with the behavior of an autonomy system in the same situation.

Figure 4A:
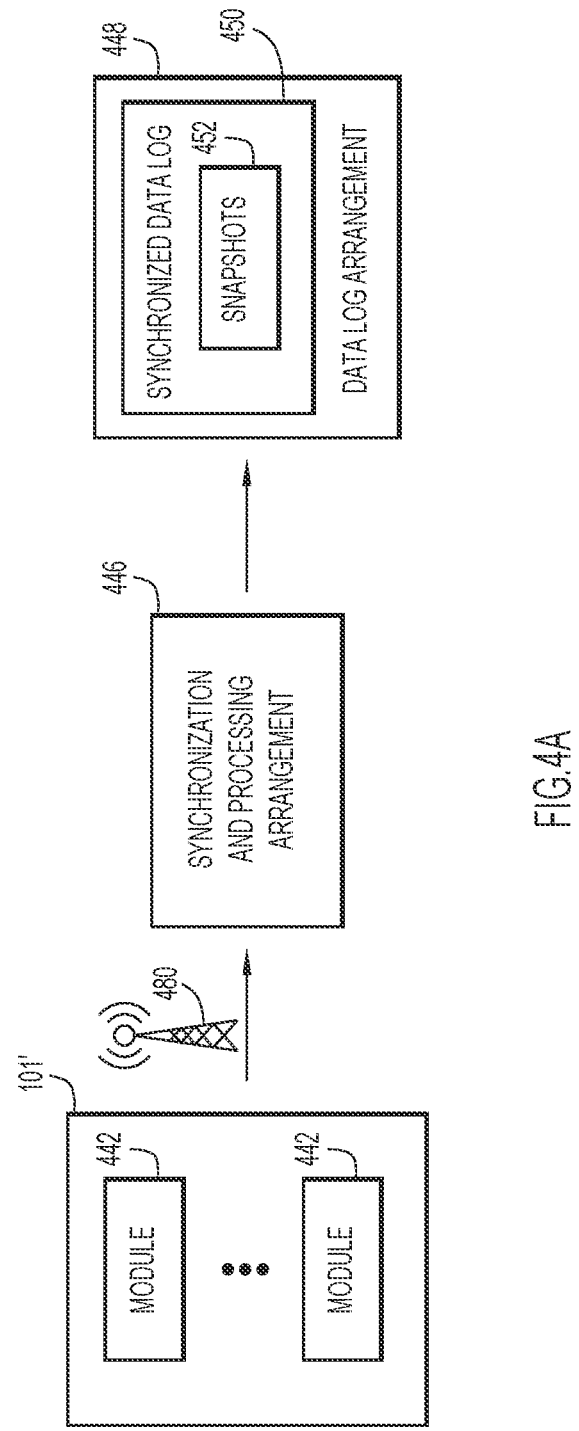
FIG. 4A is a block diagram representation of an autonomous vehicle, e.g., autonomous vehicle 101 of FIGS. 2 and 3, which is a part of a system that stores data snapshots for data collected by the vehicle, in accordance with an embodiment.

An overall system or framework that synchronizes data and creates data snapshots may include the autonomous vehicle and remote sub-systems, or the system may be included on an autonomous vehicle. FIG. 4A is a block diagram representation of an autonomous vehicle, e.g., autonomous vehicle 101 of FIGS. 2 and 3, which is a part of a system that stores data snapshots of data collected by the vehicle in accordance with an embodiment. Autonomous vehicle 101' includes various modules 442 that substantially concurrently collect data while autonomous vehicle 101' operates, as for example in an autonomous mode. A synchronization and processing arrangement 446, which may be in communication with autonomous vehicle 101' through a network such as a wireless network, is configured to obtain data from modules 442, and to synchronize and to process the data such that snapshots 452 of data may be generated or otherwise created.

Synchronization and processing arrangement 446 is configured to store snapshots 452 in a synchronized data log 450 as part of a data log arrangement 448, which may be a part of synchronization and processing arrangement 446 or, as shown, may be in communication with synchronization and processing arrangement 446. Snapshots 452 may include contextual information, such as index information and/or metadata, discussed in further detail herein, which may substantially identify contents of snapshots 452.

Each snapshot 452 that is created and stored via synchronization and processing arrangement 446 may represent a 'world state' record, such that each snapshot 452 represents the state of the world as viewed or perceived by autonomous vehicle 101 based on raw data obtained from various modules 442 and/or derived data that is calculated/derived from the raw data obtained from various modules 442 that is synchronized and stored in the synchronized data log.

In the described embodiment, synchronization and processing arrangement 446 is further configured to store synchronized data log 450, which includes a series of snapshots 452 created over time, in data log arrangement 448. Stated differently, synchronized data log 450 may include substantially all data generated or obtained by modules 442, as well as index information and/or metadata determined and/or derived from the data, stored as snapshots 452. In some instances, data log arrangement 448 may include other logic, etc., as discussed in further detail herein, that enables snapshots 452 to be searched, filtered, etc. in order to identify scenes of interest.

Snapshots 452 can include raw data obtained from each module 442 at particular times or over particular periods of time along with index information and/or metadata, such that each snapshot 452 is effectively a set of data that is associated with a particular time or a period of time. Generally, raw data is obtained asynchronously from each module 442 and synchronization and processing arrangement 446 provides for accumulating the raw data and synchronizing the raw data, along with index information and/or metadata, to a particular synchronization time.

In some instances, the synchronization time to which data is synchronized may be a particular time or substantially the particular time (e.g., within a degree of error to the particular time), such that data that is associated with the particular time can be identified and stored together for a given snapshot 452. In some instances, the synchronization time to which data is synchronized may be a period of time, such that data can be accumulated/derived over the period of time and then synchronized and stored for a given snapshot 452.

Snapshots 452 can be created and stored at a given snapshot frequency, such that raw data can be accumulated and synchronized index information and/or metadata can be determined/derived, and snapshots 452 can be stored sequentially within synchronized data log 450 according to the snapshot frequency. In at least one embodiment, the snapshot frequency may be set to 10 Hertz (Hz), such that snapshots 452 are created and stored at every one-tenth of a second (sec).

Accordingly, snapshots 452 can represent a snapshot of data obtained and derived at a particular time (e.g., 0.1 sec for a first snapshot, 0.2 sec for a second snapshot, and so on) or over a period of time (e.g., 0.0 sec-0.1 sec for a first snapshot 452, 0.11 sec-0.2 sec for a second snapshot 452, and so on; or, in another embodiment, data derived from multiple increments of synchronized data that has been accumulated/buffered over a range of time, such as over 1 second or multiple seconds) in which synchronized data log 450 generally includes all data that is synchronized by synchronization and processing arrangement 446. In one embodiment, snapshots 452 are effectively stored in a time stamp order, or sequentially based upon a particular time or period of time that is associated with each snapshot. A time stamp associated with a given snapshot is referred to herein as a 'snapshot time stamp', which may be distinguished from time stamp information or other timing related information/indicators (e.g., sequence numbers, etc.) that can be included in raw data obtained from modules 442. As the synchronization time to which raw data is synchronized can be either a particular time or a particular period of time, the snapshot time stamp provided for a given snapshot can indicate either the particular time or the ending time of particular period of time associated with the given snapshot. For example, a snapshot time stamp set to "0.1" can, depending on how data is synchronized, indicate data synchronized for a particular time of 0.1 sec or can indicate data synchronized for a period of time ending at 0.1 second (e.g., 0.1 sec corresponds to asynchronous data obtained and synchronized for a period of time between 0.0 sec-0.1 sec). It should be appreciated that other snapshot time stamp variations can be envisioned. For example, a snapshot time stamp can include any variation/combination of a day/date/hour/minute/second/sub-second time stamp.

Further, it is to be understood that in some embodiments a data snapshot or world state can be computed with information that has been synchronized and buffered up to a given world state's time stamp (snapshot time stamp), which could thus include information even before the 0.1 sec window preceding the world state's time stamp. This may be useful when computing a derived index that may involve information for some data source that has been synchronized and buffered over a range or window of time. For example to determine whether an autonomous vehicle is making a left or a right turn, multiple localization measurements may be synchronized and buffered over at least 0.3-0.4 sec in order to have sufficient measurements to mathematically compute that a turn is being made. Stated differently, data snapshots or world states may, in some embodiments, be computed over a multi-second sliding window of data (e.g., 10 sec in length) such that the window of data can be slid over 0.1 sec increments of synchronized data to compute/derive index information accumulated up to a given increment in which case the snapshot time stamp of a given data snapshot/world state including index information identified as well as index information derived/computed over the window of data would correspond to end time of the 10 second window for the 0.1 sec increment, and so on as the window continues to be slid over the synchronized data. Thus, in at least one embodiment, asynchronous data that has been synchronized according to 0.1 sec increments of time could be accumulated such that indexing information for data snapshots/world states could be identified and/or derived/computed over the accumulated data using sliding window computations over the accumulated/synchronized data.

The frequency at which snapshots are created and stored may vary widely depending, for instance, upon the granularity of data desired and/or an acceptable granularity of data. In general, increasing a number of snapshots generated and stored may reduce the amount of interpolation that may be needed to ascertain changes between consecutive snapshots. On the other hand, reducing a number of snapshots generated and stored may utilize less computational overhead, and storing fewer snapshots may be more practical and feasible than storing a relatively high number of snapshots. For example, in one embodiment, snapshots which correspond to a sampling frequency of approximately ten Hertz (HZ) (e.g., 0.1 sec increments of time) or less may be generated and stored. It should be appreciated, however, that the frequency of stored snapshots may vary without departing from the spirit or the scope of the disclosure.

Figure 4B:
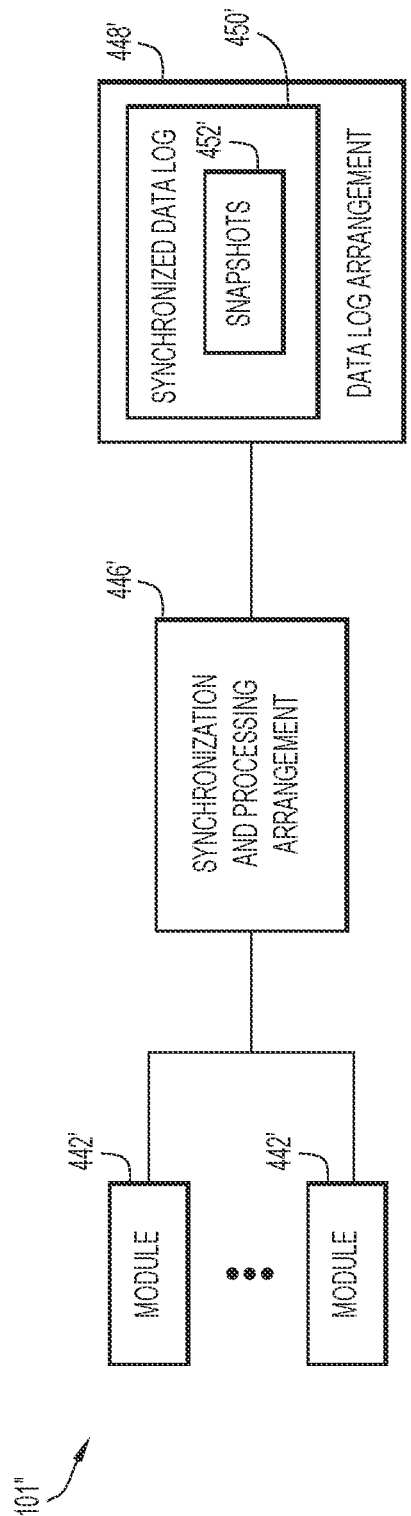
FIG. 4B is a block diagram representation of an autonomous vehicle, e.g., autonomous vehicle 101 of FIGS. 2 and 3, which is arranged to store data snapshots for data collected by the vehicle, in accordance with an embodiment.

With reference to FIG. 4B, an overall system or framework which generates and stores snapshots on a vehicle will be described in accordance with an embodiment. Autonomous vehicle 101" includes modules 442' that substantially concurrently collect data while autonomous vehicle 101"

operates, as for example in an autonomous mode. Autonomous vehicle 101" includes a synchronization and processing arrangement 446' and a data log arrangement 448'. Synchronization and processing arrangement 446' is arranged to obtain data from modules 442', and to synchronize and to process the data such that snapshots 452' of data may be generated or otherwise created. Synchronization and processing arrangement 446' causes snapshots 452' to be stored in synchronized data log 450' as part of data log arrangement 448'.

With continued reference to FIGS. 4A and 4B, it is to be understood that the system of FIG. 4A illustrates an embodiment in which snapshots 452 can be created remote from vehicle 101 (e.g., not onboard the vehicle) based on data obtained by synchronization and processing arrangement 446 from modules 442 in which vehicle 101 communicates the data to synchronization and processing arrangement 446 via a wireless link 480. In contrast, FIG. 4B illustrates an embodiment in which snapshots 452' can be created on-board vehicle 101".

Thus, it is to be understood that data snapshots of data obtained from modules of an autonomous vehicle can be created and stored using any combination of on-board and/or remote synchronization and processing arrangements, in accordance with embodiments herein.

Modules of an autonomous vehicle, such as modules 442 of FIG. 4A and modules 442' of FIG. 4B, may be any suitable hardware and/or software module associated with an autonomous vehicle that can obtain and/or process data captured by sensors of the autonomous vehicle (e.g., via sensor system 324) and/or output/generated by other systems of the autonomous vehicle (e.g., via combination of systems 308, 312, 336, 332, and/or 340).

Figure 5:
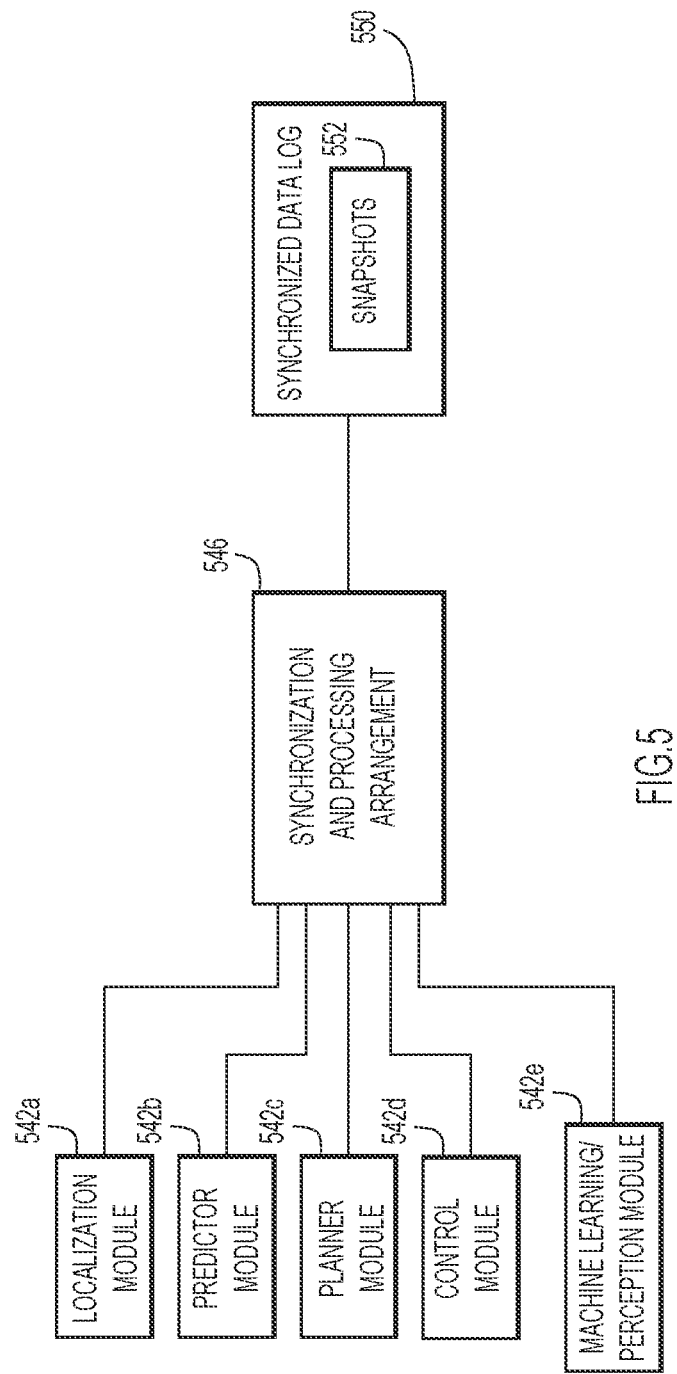
FIG. 5 is a block diagram representation of modules of an autonomous vehicle which are configured to provide data that may be stored as data snapshots, in accordance with an embodiment.

Referring next to FIG. 5, modules of an autonomous vehicle which are configured to provide data that may be stored as data snapshots in accordance with an embodiment. Modules 542*a-e*, which may be included in an autonomous vehicle such as autonomous vehicle 101 of FIGS. 2 and 3 may include, but are not limited to including, a localization module 542*a*, a predictor module 542*b*, a planner module 542*c*, a control module 542*d*, and a machine learning/perception module 542*e*.

Localization module 542*a* is arranged to precisely determine a location of an autonomous vehicle such as autonomous vehicle 101 of FIGS. 2 and 3. Data provided by localization module 542*a* generally includes locations, as for example a location relative to a map. Predictor module 542*b* is generally arranged to predict a path or a trajectory of other vehicles or moving/stationary objects, such that autonomous vehicle 101 of FIGS. 2 and 3 may safely navigate around the other vehicles or moving/stationary objects. Data provided by predictor module 542*b* may generally include locations, e.g., predicted locations, of other vehicles or moving objects. Planner module 542*c* is configured to plan a trajectory based on surrounding environment and a position of an autonomous vehicle such as autonomous vehicle 101 of FIGS. 2 and 3. Data provided by planner module 542*c* may generally include locations associated with a planned trajectory and vehicle position information. Control module 542*d* is generally configured to cause an autonomous vehicle such as autonomous vehicle 101 of FIGS. 2 and 3 to navigate along a trajectory, e.g., a trajectory planned by planner module 542*c*. Data provided by control module 542*d* may generally include position location associated with following a planned trajectory. Machine learning/perception module 542*e* is configured to execute one or more machine learning algorithms or, more generally, artificial intelligence algorithms, which are configured to facilitate decisions in real-time in terms of perception and identifying objects in an environment. Data provided by machine learning/perception module 542*e* may generally include information relating to objects in an environment (e.g., traffic signs, intersections, pedestrians, other vehicles, hazards, etc.), where the objects are located in the environment, and various properties for the objects (e.g., speed, classification (e.g., stop sign, yield sign, hazard type, etc.).

During operation, data from modules 542*a-e* is provided to a synchronization and processing arrangement 546 which synchronizes the data, and creates synchronized data log 550 that includes snapshots 552. Synchronization and processing arrangement 546 will be discussed below with reference to FIG. 6. Each snapshot 552 may include, but is not limited to including, data from each module 542*a-e* obtained for a particular time or a particular period of time, as well as index information and/or metadata, as discussed herein.

Figure 6:
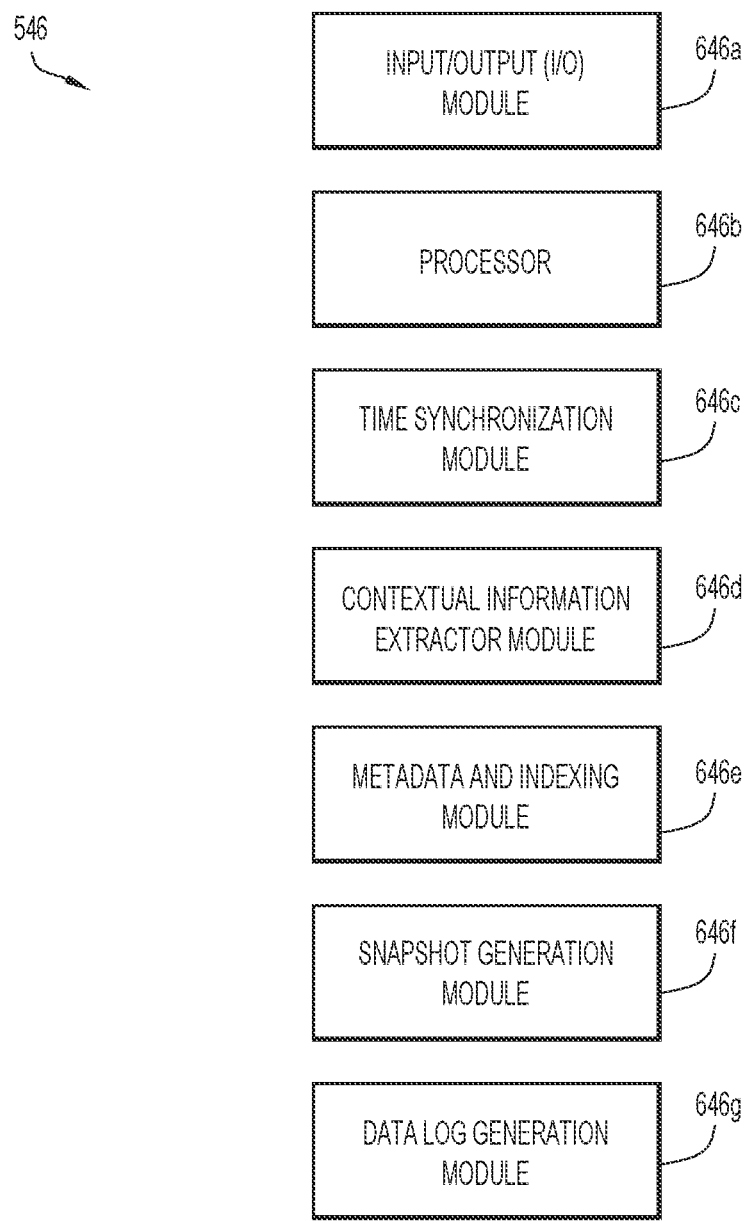
FIG. 6 is a block diagram representation of a synchronization and processing arrangement, e.g., synchronization and processing arrangement 546 of FIG. 5, in accordance with an embodiment.

FIG. 6 is a block diagram representation of a synchronization and processing arrangement, e.g., synchronization and processing arrangement 546 of FIG. 5, in accordance with an embodiment. Synchronization and processing arrangement 546, which may be included on a vehicle or remote from a vehicle, is generally embodied as hardware and/or software. Synchronization and processing arrangement 546 includes an input/output (I/O) module 646*a*, a processor 646*b*, a time synchronization module 646*c*, a contextual information extractor module 646*d*, a metadata and indexing module 646*e*, a snapshot generation module 646*f*, and a data log generation module 646*g*. It is to be understood that various elements illustrated in FIG. 6 may interface and/or be interconnected (e.g., wired/electrically interconnected and/or wirelessly interconnected) in any suitable manner to facilitate operations as described herein.

I/O module 646*a*, which may generally be a communications module, is arranged to obtain data from modules such as module 542*a-e* of FIG. 5, and to provide data logs and/or snapshots. I/O module 646*a* may be arranged to support wired and/or wireless communications including, but not limited to including, Institute of Electrical and Electronics Engineers (IEEE) 802.11 communications (e.g., Wi-Fi®), Third Generation Partnership Project (3GPP) communications (e.g., 3G/4G/5G/nG), Bluetooth® communications, combinations thereof, and/or the like.

Processor 646*b* is configured to execute software associated with synchronization and processing arrangement 546. Processor 646*b* may include one or more microprocessors.

Time synchronization module 646*c* is configured to synchronize asynchronous raw data obtained by I/O module 646*a* such that raw data asynchronously obtained from different modules 542*a-e* of FIG. 5 may be synchronized in terms of time or, stated differently, may be synchronized to a synchronization time in which, as noted above, the synchronization time can either be a particular time or can be a particular period of time. Generally, synchronizing asynchronous raw data can include identifying and grouping raw data together that is associated with a particular synchronization time (e.g., a particular time or a particular period of time), such that the synchronized data can be used to generate a given snapshot of the synchronized data.

That is, in some instances if the synchronization time to which asynchronously obtained raw data is to be synchronized is a particular time (e.g., synchronization time=1.1 seconds, and so on for multiple synchronization times), time synchronization module 646*c* can identify and group together data obtained/accumulated asynchronously from different modules 542*a-e* of FIG. 5 that corresponds to the particular time or corresponds substantially to the particular time as indicated by the data (e.g., the data includes a particular time indicator or sequence indicator that is common across data obtained from different modules 542*a-e* or is within a degree of error (e.g., +/−0.01 seconds) of the particular time indicator) such that the synchronized data can be used via contextual information extractor module 646*d*, metadata and indexing module 646*e*, and snapshot generation module 646*f* to generate a snapshot of the synchronized data.

In other instances, if the synchronization time to which data is to be synchronized is a particular period of time (e.g., a period of time=0.1 seconds), synchronization module 646*c* can synchronize raw data obtained/accumulated asynchronously from different modules 542*a-e* of FIG. 5 that corresponds to the particular period of time. For example, if the synchronization time is a period of time corresponding to 0.1 seconds, time synchronization module 646*c* can identify and group together raw data obtained/accumulated asynchronously from different modules 542*a-e* of FIG. 5 that corresponds to the particular period of time (e.g., data that includes a particular time or sequence indicator that is between 0.0 seconds and 0.1 seconds, and so on for multiple periods of time, potentially including a degree of error for each period) such that the synchronized data can be used via contextual information extractor module 646*d*, metadata and indexing module 646*e*, and snapshot generation module 646*f* to generate a snapshot of the synchronized data.

In yet another instance, accumulated raw data can be synchronized and accumulated into time-ordered/sequential increments of data (0.1 sec increments), such that the accumulated/synchronized data can be analyzed via contextual information extractor module 646*d*, metadata and indexing module 646*e*, and snapshot generation module 646*f* using a sliding window that determines and derives indexing information across multiple increments of synchronized data to generate a snapshot of the synchronized data corresponding to the window of time, in which the snapshot time stamp for the data snapshot would correspond to the ending time of the window at one of the increments.

Snapshot generation module 646*f*, in combination with contextual information extractor module 646*d*, and metadata and indexing module 646*e*, uses synchronized data to generate snapshots (e.g., one snapshot at each of a particular time or a period of time), and data log generation module 646*g* uses multiple data snapshots generated by snapshot generation module 646*f* to store the data snapshots in order to generate a synchronized data log (e.g., snapshots 452/452' stored in synchronized data log 450/450').

Contextual information extraction module 646*d* is configured to extract contextual information from data obtained by I/O module 646*a* and synchronized by time synchronization module 646*c*. In one embodiment, contextual information extraction module 646*d* processes synchronized data generated by time synchronization module 646*c* to identify contextual information that may effectively describe associated data.

Metadata and indexing module 646*e* cooperates with contextual information extraction module 646*d* to identify metadata and/or index information that may be contained in contextual information and/or that may be associated with a given snapshot. For example, in some instances, metadata corresponding to a given snapshot may be a snapshot time stamp that can be added to and/or stored in association with the given snapshot. For instances in which the synchronization time is a period of time, the snapshot time stamp may represent the end time for the period of time associated with the raw data (or the end time of a window of raw data, which would, in effect, be the end time of a particular increment of data (e.g., 0.1 sec increment)), as well as index information and/or other metadata corresponding to the raw data, that is included in a particular snapshot. The identified metadata and index information may be stored with snapshots, or as parts of snapshots, by snapshot generation module 646*f* In some embodiments, metadata can include identification metadata of corresponding raw data. For example, a data stream or messages output by predictor module 542*b* may include a sequence identifier (ID) in which the sequence ID may be identification metadata such that the sequence ID can be used to compute any prediction-derived fields. Further, data snapshots or data snapshot portions (as discussed in further detail below with reference to FIG. 10B) stored in a synchronized data log (e.g., snapshots 452/452' stored in synchronized data log 450/450') can be assigned a unique identifier (e.g., a number, an alphanumeric value, etc.) that can uniquely identify each data snapshot, which can be stored as metadata for a data snapshot and returned during querying/filtering of data snapshots, as discussed in further detail herein.

As noted above, index information can include raw data/ information contained in synchronized data snapshots (that has been obtained from different modules 542*a-e* of FIG. 5) as well as information derived from the raw data/information, which can include contextual information extracted/ generated by contextual information extractor module 646*d*. Thus, in various embodiments, derived data may be derived from raw data/information obtained from one of modules 542*a-e* of FIG. 5 and/or may be derived from raw data/ information obtained from multiple modules 542*a-e* of FIG. 5. For example, in various instances, index information included in raw data/information output from localization module 542*a* may include a latitude, longitude, and altitude position of an autonomous vehicle; outputs from machine learning/perception module 542*e* may include classification outputs (e.g., probability that a particular vehicle is parked), and/or outputs from control module 542*d* may include an indication that braking is being applied by the control module (e.g., causing a deceleration in meters per second per second (m/s/s)). In various instances, index information derived/computed from raw data may, for example, include distance between a motion plan from planner module 542*c* and other objects (e.g., curbs, pedestrians, parked cars, etc.), semantic relationships between other vehicles and the autonomous vehicle, based on predictions (e.g., determining if the predictor module 542*b* is creating a trajectory for a cross traffic vehicle that may go in front of the autonomous vehicle or yield for the autonomous vehicle), contextual information, and/or the like. The level of detail provided by contextual information may vary, and may depend upon system requirements. By way of example, contextual information may specify substantially only the presence of a cross-street in a scene, contextual information may specify the name of the cross-street in the scene, and/or contextual information may specify the particular block of the cross-street in the scene.

In some embodiments, index information and/or metadata for a data snapshot can be updated after the snapshot is created. For example, in some instances, index information and/or metadata for a snapshot created at a first time/period of time can be updated based on raw data/index information/ metadata associated with one or more snapshots created at subsequent time(s)/time period(s) (e.g., using a sliding window over multiple data snapshots to derive additional information).

Figure 7:
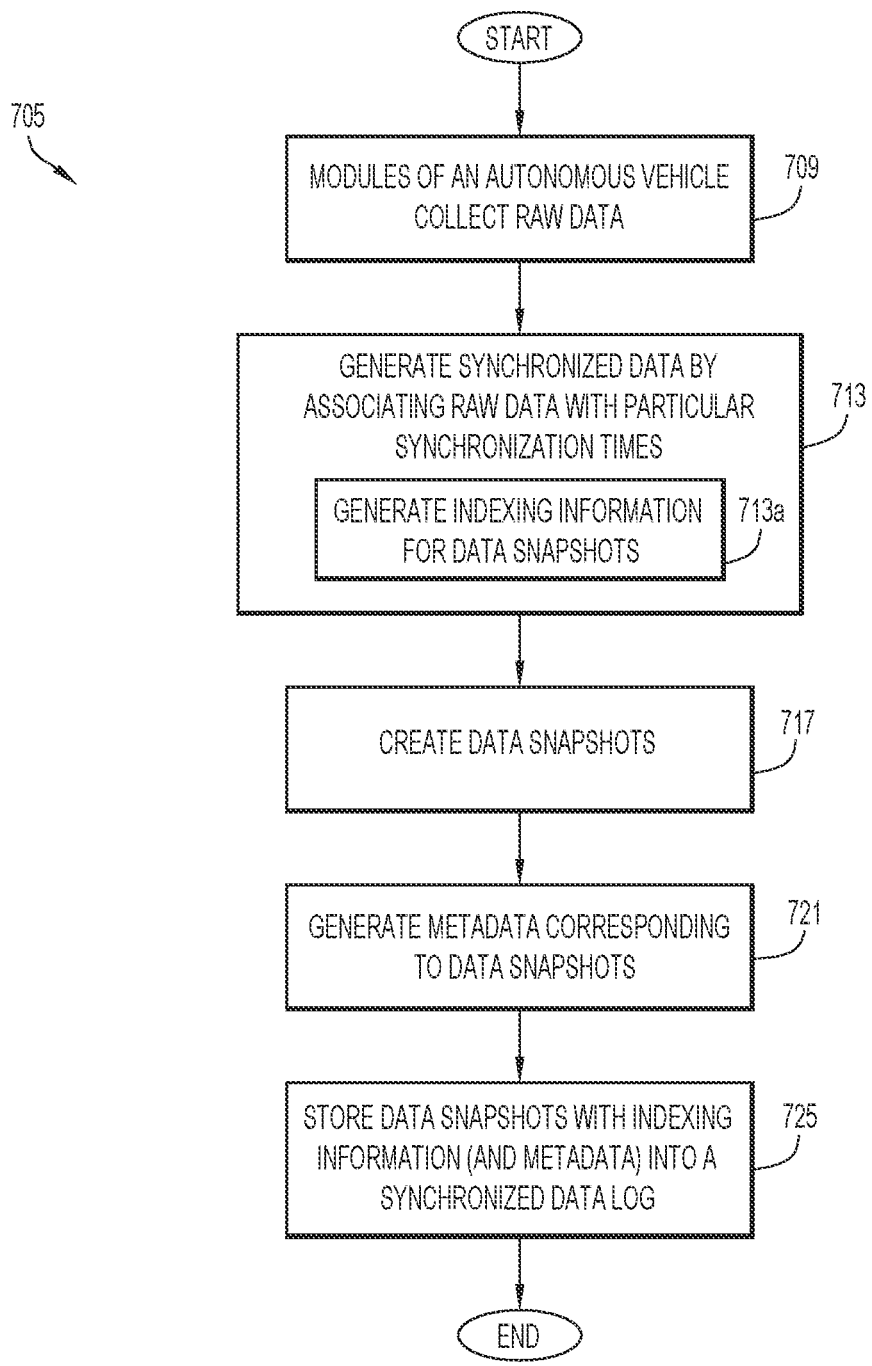
FIG. 7 is a process flow diagram which illustrates a method of generating indexable data snapshots, in accordance with an embodiment.

FIG. 7 is a process flow diagram which illustrates a method of generating indexable data snapshots in accordance with an embodiment. A method 705 of generating indexable data snapshots that may be queried, begins at a step 709 in which modules (e.g., data sources) of an autonomous vehicle collect, or otherwise generated, raw data. In one embodiment, the modules may collect or generate raw data as the autonomous vehicle drives autonomously.

In a step 713, synchronized data is generated such that the raw data collected at particular times or over particular periods of time by different modules is identified and effectively associated or grouped together for particular synchronization times in order to be saved as snapshots of synchronized data (data snapshots). In some instances, the synchronized data can be accumulated or buffered in time-ordered/sequential increments of time. As illustrated in 713a, index information for data snapshots can be generated in parallel with generating the synchronized data. As noted, the index information can include portions of the raw data collected from the module of the autonomous vehicle and/or information derived from the raw data. In some embodiments, generating index information can include identifying information within raw data that corresponds to index information and/or deriving index information from the raw data as data corresponding to a particular synchronization time is identified and associated/grouped together. In some embodiments, generating index information can include identifying information within raw data that has been synchronized/accumulated over multiple increments of time that corresponds to index information and/or deriving index information from the raw data that has been synchronized/accumulated over multiple increments of time (e.g., using a sliding window to derive information over multiple increments of synchronized data at a given snapshot generation frequency).

In one embodiment, identifying index information within raw data can included parsing the raw data to identify information that matches preconfigured types of index information (e.g., location information, path information, position information, object information/object type information, etc.) and/or deriving/calculating index information based on the raw data (e.g., determining a turn, determining surrounding information, determining semantic relationships, etc.). During operation, for example, if a particular index is to be identified/computed, raw data can be drawn from a set of sources (e.g., outputs from one or more modules) associated with the index that is to be computed. More broadly, for a given data snapshot or world state that is to be created, a superset of raw data from various data sources can be determined based on the indexing information that is desired to be created for the snapshot/world state. Once the sources of the raw data are determined, indexing information can be generated and/or computed based on the raw data obtained from the sources that has been synchronized and, potentially, accumulated over multiple time-ordered/sequential increments. Thus, although not illustrated in FIG. 7, in some embodiments, generating synchronized data and indexing information at 713/713a may include selecting one or more modules from which the raw data is to be obtained for generating data snapshots based on the indexing information that is desired to be identified/generated for the data snapshots.

Once the data is synchronized and index information is generated, data snapshots are created in a step 717. Thus, each data snapshot may be created to include data obtained at a particular time or over a period of time from different modules of the autonomous vehicle. The creating of data snapshots will be discussed in more detail below with respect to FIG. 8.

After data snapshots are created, contextual information such as metadata corresponding to the data snapshots is generated in a step 721. The contextual information may be obtained from the snapshots of synchronized data or may be added to the data. For example, in one instance, metadata corresponding to a given snapshot may be a snapshot time stamp that can be added to and/or stored in association with the given snapshot.

Upon generating metadata, data snapshots are stored in a step 725 with indexing information into a synchronized data log. In one embodiment, metadata may also be stored with or in the snapshots. The method of generating indexable data snapshots is completed once the data snapshots are stored with indexing information/metadata into the synchronized data log. The data snapshots can be stored in the synchronized data log in a sequential order based on the snapshot time stamps. Thus, method 705 facilitates creating, based on synchronized data, a data snapshot for each of a plurality of synchronization times in which each data snapshot created for each synchronization time comprises index information that identifies a world state for the autonomous vehicle and the raw data obtained from the plurality of data sources, and each data snapshot is stored with the indexing information in the synchronized data log. As described herein, generating the synchronized data can include identifying index information contained within the raw data, and/or generating index information based on the raw data (e.g., based on accumulations of the raw data).

Figure 8:
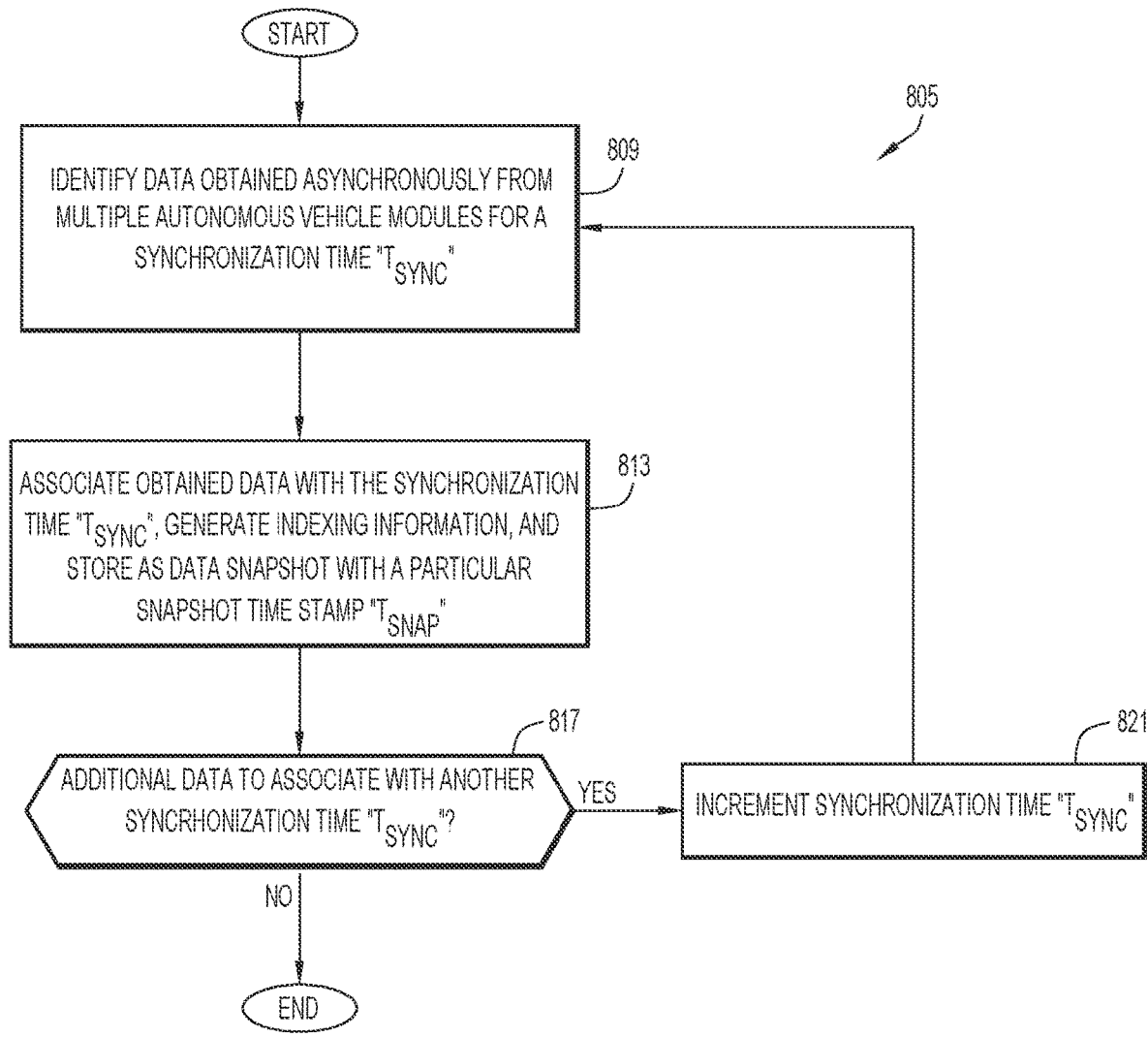
FIG. 8 is a process flow diagram which illustrates a method of creating data snapshots, in accordance with an embodiment.

FIG. 8 is a process flow diagram which illustrates a method 805 of creating data snapshots, in accordance with an embodiment. Recall, raw data obtained by a synchronization and processing arrangement (e.g., synchronization and processing arrangement 546) from modules of an autonomous vehicle (e.g., modules 542a-e of FIG. 5 or, more generally, data sources) is obtained asynchronously by the synchronization and processing arrangement. Generally, method 805 may include operations as discussed for steps 713/713a, 717, and 725 of method 705 as discussed above for FIG. 7, however, it is to be understood that metadata, as discussed at 721, may also be generated for data snapshots in accordance with embodiments herein.

Method 805 of creating data snapshots begins at a step 809 in which raw data obtained asynchronously from multiple modules (e.g., data sources) pertaining to the operation of an autonomous vehicle for a synchronization time "$T_{SYNC}$" are identified (e.g., based on time indicators and/or sequence indicators included in the raw data). As noted herein, the synchronization time may correspond to a particular time (within a degree of error) or may correspond to a particular period time (within a degree of error). The modules or data sources from which the raw data may include, but are not limited to including, a localization module, a predictor module, a planner module, a control module, and/or a machine learning/perception module.

Once raw data for the synchronization time of "$T_{SYNC}$" is identified, the raw data is associated or grouped together for the synchronization time (e.g., a particular time/particular period of time), indexing information is generated from the raw data (which can include information contained in the raw data and/or information derived from the raw data), and the raw data and indexing information (along with metadata) is stored as a snapshot with a particular snapshot time stamp "$T_{SNAP}$" in a step 813.

In some instances, only data output from one or more selected module may be used to generate data snapshots. Thus, in some instances, method 805 can include selecting modules and corresponding output data from which to generate data snapshots/the synchronized data log. In a step 817, a determination is made as to whether there is additional data to process. That is, it is determined whether there is additional data to associate with another synchronization time.

If the determination in step 817 is that there is additional data to process, the synchronization time "$T_{SYNC}$" is incremented in a step 821, and the process flow returns to step 809 in which data from multiple modules for the incremented synchronization time "$T_{SYNC}$" is identified. Alternatively, if the determination in step 817 is that there is no additional data to process, then the process of creating data snapshots is completed.

Although indexing information/data snapshots are illustrated in FIG. 8 as being generated/stored at each synchronization time, in some instances as discussed for embodiments herein, generating indexing information and storing a data snapshot can be performed across multiple synchronizations of raw data for multiple increments of time (e.g., for a large window/range of time). For example, for use cases in which a sliding window is used to generate data snapshots, raw data that has been synchronized can be accumulated in time-ordered/sequential increments (e.g., for multiple synchronization times) such that index information can be identified/derived across at least two synchronized increments of data (based on the start/end time of the sliding window) in order to generate a data snapshot that is representative of the at least two synchronized increments of the raw data up to the last increment of synchronized data contained within the sliding window. As additional raw data is obtained and synchronized into a new increment for another synchronization time (e.g., 821), the window can be advanced to the new increment of synchronized data in order to identify/compute indexing information and generate a new data snapshot for synchronized data accumulated up to the new increment of synchronized data, and so on for additional new raw data that is synchronized.

Any combination of per-synchronization time indexing information/snapshot generation and windowed indexing information/snapshot generation can be envisioned. For example, in some instances certain indexing information can be generated for snapshots ever 0.1 sec while for every 1 second additional indexing information can be generated for a given 0.1 sec increment snapshot based on 10 synchronized data increments accumulated over a period of 1 second, which can be shifted on a per-increment basis or on a per-second basis, depending on implementation. Other window time periods (e.g., greater or less than 1 second) can be envisioned in accordance with embodiments herein.

Figure 9:
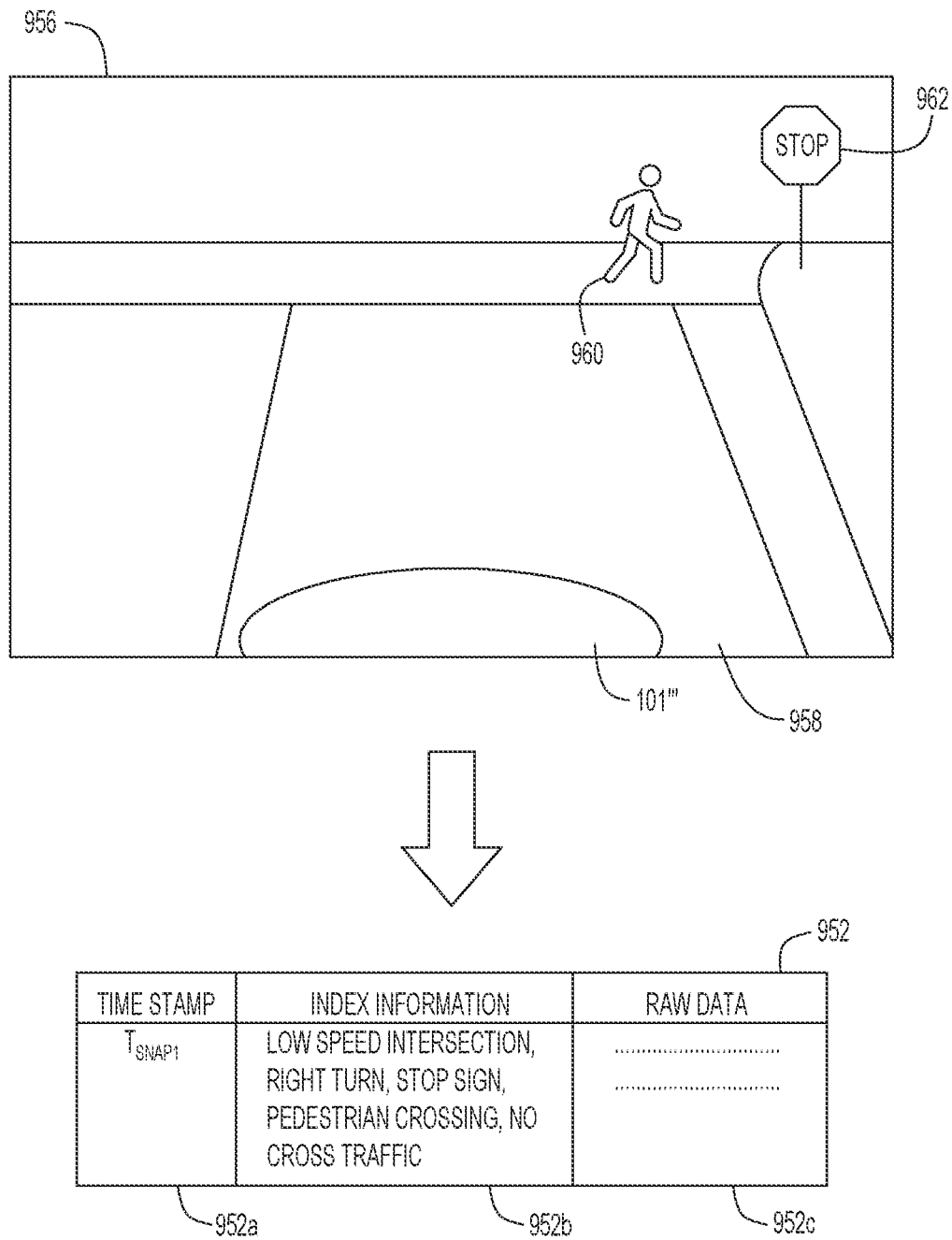
FIG. 9 is a diagrammatic representation of a snapshot stored with index information, in accordance with an embodiment.

FIG. 9 is a diagrammatic representation of a snapshot 952 stored with index information in accordance with an embodiment. A scene 956, or an instant state of the world as viewed from an autonomous vehicle 101''' for snapshot 952 associated with a snapshot time stamp 952a, ($T_{SNAP1}$), may be substantially captured by sensors mounted on or within vehicle 101'''. Sensors may capture data relating to a scene 956, and modules of vehicle 101''' may process the data captured by sensors. By way of example, a planner module may process sensor data relating to scene 956 to plan a trajectory or route for vehicle 101'''.

As shown, at snapshot time stamp "$T_{SNAP1}$," scene 956 includes a roadway 958, a pedestrian 960 is crossing roadway 958, and a stop sign 962 is present. Vehicle 101' is travelling on roadway 958 and approaching stop sign 962 as pedestrian 960 crosses roadway 958.

A snapshot 952 of scene 956 at snapshot time "$T_{SNAP1}$" includes the snapshot time stamp 952a, index information 952b, and raw data 952c. Snapshot time stamp 952a identifies time "$T_{SNAP1}$" as being the time raw data 952c is captured or synchronized (e.g., a particular time or an end time for a period of time if snapshots are created for a particular time period).

Generally, the snapshot time stamp 952a represents the order or sequence in which raw data is obtained, synchronized, and stored (e.g., in a synchronized data log), which can improve the ability to search or query information from the raw data/index information, as opposed to performing searches over a large log of asynchronous data that is merely stored in the (asynchronous) order that it is received. The snapshot time stamp 952a can indicate a particular time or period of time. For example, "$T_{SNAP1}$" can be set to "1.1" to indicate a period of time ending at 1.1 seconds, which could be representative of data synchronized at a particular time of 1.1 seconds or accumulated/synchronized and indexing information/metadata generated over a period of time or a window of time ending at 1.1 seconds.

Index information 952b is contextual information stored to facilitate a querying process in which snapshot 952 is searched or queried. Index information 952b generally identifies the state of the world, as viewed from vehicle 101''' at snapshot time stamp "$T_{SNAP1}$." For example, as shown, index information 952b identifies scene 956 as including a low speed intersection, a right turn, a stop sign, a pedestrian crossing, and a lack of cross traffic. As a result, when a query includes information stored in index information 952b, or a filter specifies information that substantially matches index information 952b, snapshot 952 would be identified or otherwise provided in response to the query. Raw data 952c may include, but is not limited to including, localization data, predictor data, planner data, control data, and/or machine learning data that corresponds to scene 956.

Snapshot 952 may be accessed by a system which supports queries for particular scenes or scenarios. Although snapshot 952 is illustrated in FIG. 9 as a single snapshot that can be stored in a synchronized data log, when a given snapshot is stored in memory and/or storage, the snapshot may, in some embodiments, be partitioned and stored separately as different portions of a single snapshot in which each partitioned portion of a snapshot may include particular types of raw data/index information obtained/derived from a subset of modules of an autonomous vehicle. For example, a first partitioned portion of a snapshot may be stored that includes raw data/index information based on raw data output by a localization module and a machine learning module, while raw data/index information based on raw data output by other modules of an autonomous vehicle stored may be stored in a second portioned portion of the snapshot.

Storing each snapshot of multiple snapshots into corresponding partitioned portions based on the type of raw data/index information obtained/derived from one or more modules may improve efficiency for querying and/or filtering snapshots by reducing the amount of data that is to be queried/filtered. Stated differently, in one embodiment, data may be partitioned such that a snapshot, or a world state record, may be stored as separate object files in order to reduce the amount of data to be read during querying or filtering of snapshots.

For example, queries/filters for a type of scene or issue associated with certain type of data/index information obtained/derived from one or more modules may be executed by searching over partitioned portions of snapshots that include such types of data/index information obtained/derived from such module, while other portioned portions of snapshots that do not include such types of raw data/index information are not searched.

Metadata for a partitioned portion can include any combination of: metadata describing the type(s) of data/index information obtained/derived from one or more modules for a corresponding partitioned portion of a snapshot (e.g., objects near an autonomous vehicle obtained/derived via a machine learning module and a predictor module, location/position information for an autonomous vehicle obtained/derived via a localization module and a planner module); metadata describing the module(s) associated with the data/contextual information contained in a corresponding partitioned portion of a snapshot can be generated and stored in each partitioned portion of each snapshot and/or can be stored in association with each partitioned portion of each snapshot; and/or metadata described the type(s) of scene(s), scenario(s), and/or issue(s) that may be associated with/represented within the data/index information contained within a corresponding partitioned portion of a snapshot.

FIGS. 10A and 10B illustrates example details that may be associated with storing snapshots in a synchronized data log. As illustrated in FIG. 10A, a synchronized data log 1010 may include snapshots 1020-1, 1020-2, thru 1020-N in which each corresponding snapshot can be stored for synchronized data log 1010 as a full data snapshot including index information/metadata corresponding to each snapshot time stamp. Each corresponding snapshot 1020-1, 1020-2, thru 1020-N can include raw data/index information as well as metadata identifying each corresponding snapshot time stamp for each corresponding snapshot time stamp (e.g., snapshot 1020-1 including snapshot time stamp $T_{SNAP1}$, snapshot 1020-2 including snapshot time stamp $T_{SNAP2}$, thru snapshot 1020-N including snapshot time stamp $T_{SNAPN}$).

As illustrated in FIG. 10B, a synchronized data log 1050 may include snapshots 1070-1, 1070-2, thru 1070-N, in which each corresponding snapshot in which each corresponding snapshot can be stored for synchronized data log 1010 in partitioned portions such that each partitioned portion includes certain types or a subset of raw data/index information obtained/derived from one or more modules that are a subset of all modules of an autonomous vehicle. For example, snapshot 1070-1 can be stored for synchronized data log 1050 in a first partitioned snapshot portion 1070-1-1 and a second partitioned snapshot portion 1070-1-2. The first partitioned portion 1070-1-1 stored for the first snapshot 1070-1 can include metadata identifying the snapshot time stamp "$T_{SNAP1}$" and metadata identifying the data type(s) and/or module type(s) associated with raw data/index information contained in the first partitioned snapshot portion 1070-1-1. Similarly, the second partitioned snapshot portion 1070-1-2 stored for the first snapshot 1070-1 can include metadata identifying the snapshot time stamp "$T_{SNAP1}$" and metadata identifying the data type(s) and/or module type(s) associated with raw data/index information contained in the second partitioned portion 1070-1-2.

Similarly, partitioned snapshot portions 1070-2-1 and 1070-2-2 can be stored for synchronized data log 1050 including corresponding raw data/index information and metadata for snapshot 1070-2, as well as for any additional snapshots (e.g., thru snapshot 1070-N including partitioned snapshot portions 1070-N-1 and 1070-N-2).

Although not illustrated in FIGS. 10A and 10B, in some instances, a synchronized data log can include metadata identifying characteristics of the synchronized data log. For example, in some instances, a synchronized data log can include a version number, such that the version number can be incremented as new data (e.g., new snapshots) are added to the synchronized data log.

Figure 11:
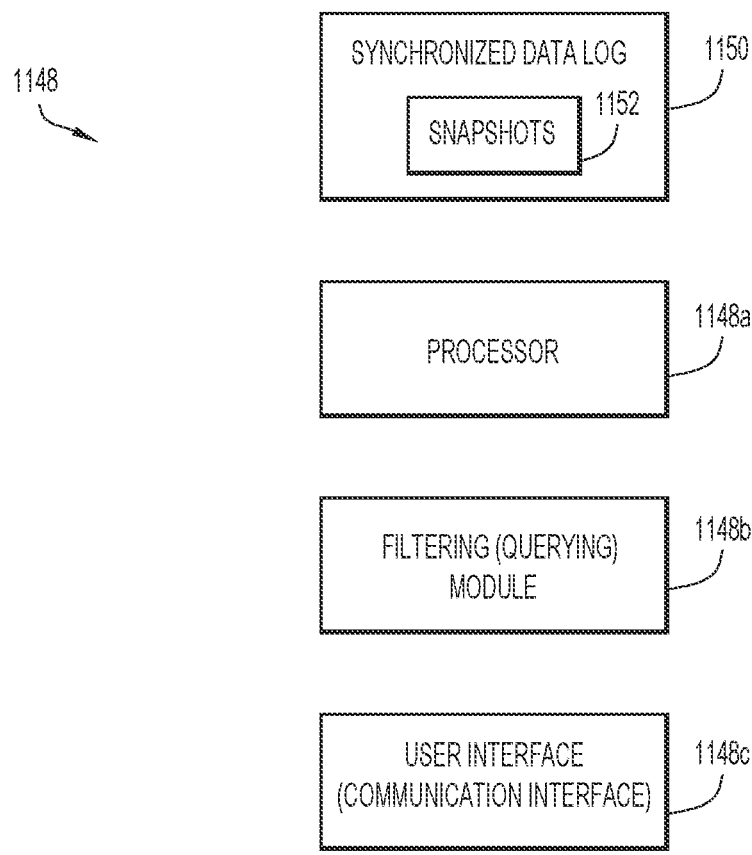
FIG. 11 is a block diagram representation of a system which allows a user to search for a scene or a scenario, in accordance with an embodiment.

As noted above, snapshots for a synchronized data log may be accessed by a system which supports queries for particular scenes or scenarios. FIG. 11 is a block diagram representation of a system which allows a user to look up or otherwise search for a scene or a scenario using contextual information in accordance with an embodiment. A system 1148, which may generally be representative of a data log arrangement, may be used by a user to submit a query or to provide a filter to identify the existence of scenes or scenarios may generally include hardware and/or software components.

System 1148 includes synchronized data log 1150 that includes snapshots 1152. Synchronized data log 1150 including snapshots 1152 may generally be stored locally on system 1148, as for example on a hard drive. It should be appreciated, however, that synchronized data log 1150 and snapshots 1152 may instead be stored at a remote location such as a cloud server (not shown), and may be accessible to system 1148. Further, it should be appreciated that snapshots 1152 for synchronized data log 1150 may be stored as full data snapshots (e.g., as illustrated in FIG. 10A) or may be stored as partitioned portions of data snapshots (e.g., as illustrated in FIG. 10B).

System 1148 also includes a processor 1148a, a filtering or querying module 1148b, and a user interface 1148c. Processor 1148a is configured to cooperate with filtering or querying module 1148b to process queries or filters specified using user interface 1148c. Filtering or querying module 1148b obtains a query or a filter, and searches snapshots 1152 to determine whether any snapshots 1152 match the query or the filter. If filtering or querying module 1148b identifies at least one snapshot 1152, information relating to the at least one snapshot 1152 may be provided to a user via user interface 1148c.

User interface 1148c may generally be a communication interface. That is, while user interface 1148c may be an input interface which allows for a user to enter or otherwise specify a query or a filter, user interface 1148c may instead or additionally include a communication interface that allows system 1148 to communicate with a remote user to obtain a query or a filter. It is to be understood that various elements illustrated in FIG. 11 may interface and/or be interconnected (e.g., wired/electrically interconnected and/or wirelessly interconnected) in any suitable manner to facilitate operations as described herein.

As previously mentioned, snapshots may be searched to identify specific scenes or scenarios. Further as previously noted, a "scene" may refer to a particular snapshot, whereas a "scenario" may refer to a series of snapshots. Thus, a scene may be identified when a search specifies a particular characteristic that is included in that scene. For example, snapshot 952 associated with scene 956 of FIG. 9 may be identified when a search specifies contextual information (e.g., index information) such as "stop sign."

In another example, a scenario may be identified when a search specifies an action or an event that would be captured in a series of snapshots. For example, of a search specifies a characteristic such as "vehicle slows down and drives around pedestrian," such a characteristic would be manifested over a series of snapshots and not just one snapshot. The use of index information (and potentially other metadata, as discussed herein) allows a search to be efficiently performed to identify a number of consecutive scenes over a range of time which, together, exhibit the desired characteristic.

Figure 12:
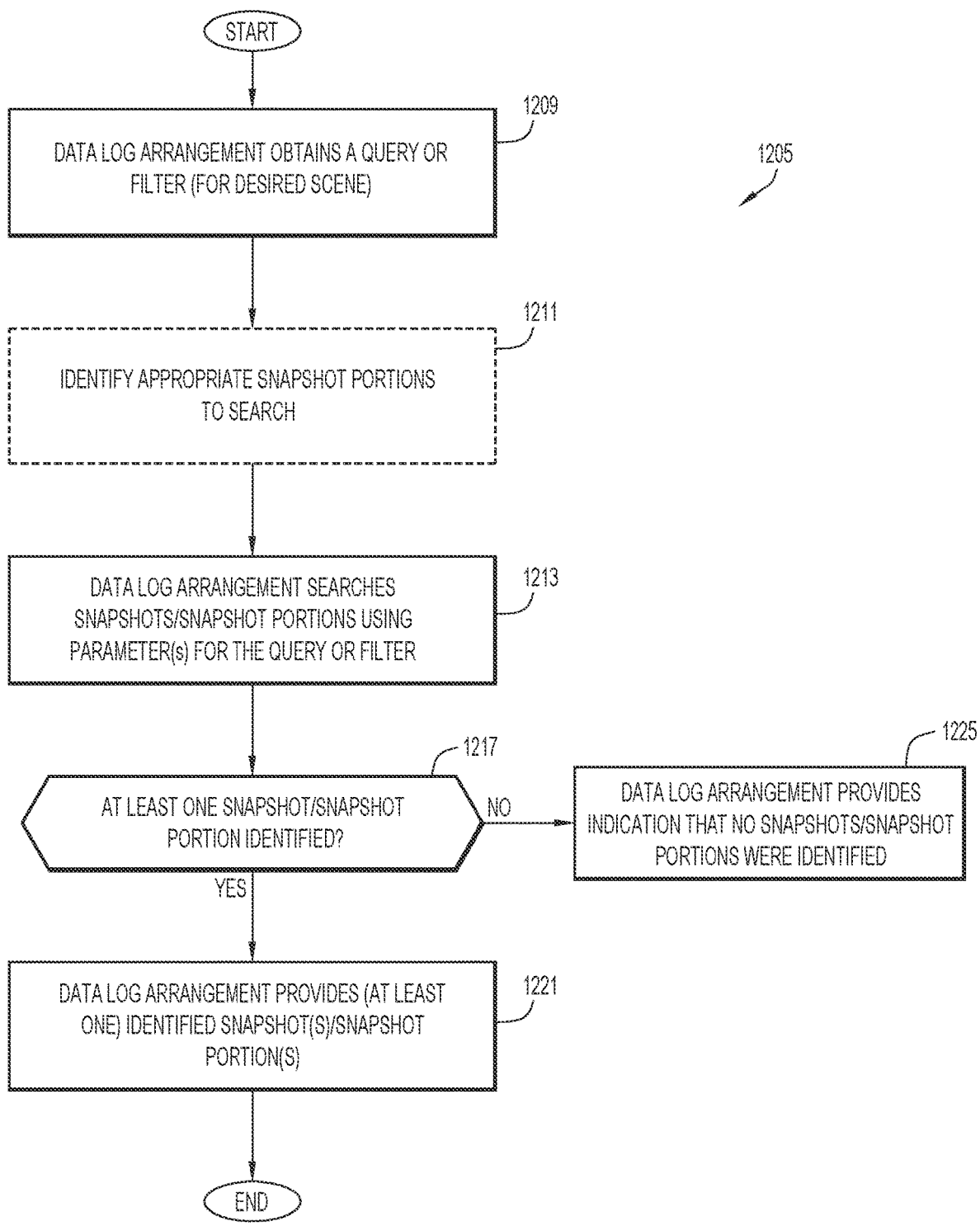
FIG. 12 is a process flow diagram which illustrates a method of utilizing indexable snapshots of data to identify at least one scene, in accordance with an embodiment.

FIG. 12 is a process flow diagram which illustrates a method 1205 of utilizing indexable data snapshots or data snapshot portions to identify at least one scene in accordance with an embodiment. The method 1205 of identifying at least one scene begins at a step 1209 in which a data log arrangement, e.g., system 1148 of FIG. 11, obtains a query or a filter. The query or filter, which may be obtained from a user, may specify one or more characteristics or qualities desired in a scene.

In some embodiments, as shown at a step 1211, the method may include identifying appropriate snapshot portions to search based on the query or filter obtained. For example, if snapshots are stored in a synchronized data log in multiple snapshot portions, the query or filter may pertain only to a subset of the multiple snapshot portions. In such instances, the query or filter may identify: corresponding snapshot portion(s) that are to be searched, snapshot portions containing certain types of index information that are to be searched, snapshot portions containing index information for certain types of module(s) that are to be searched, any combinations and/or extensions thereof, and/or the like.

In a step 1213, the data log arrangement searches snapshots (or snapshot portions, if applicable) using parameter(s) for the query or the filter. Such a search may generally include indexing into snapshots (or snapshot portions, if applicable), and determining if characteristics or parameters specified in the query or the filter substantially match characteristics stored as contextual information for the snapshots/snapshot portions.

Stated differently, performing the querying/filtering may include parsing index information and/or metadata stored for snapshots or snapshot portions stored in a synchronized data log based on one or more query/filter parameter(s) to determine whether any index information and/or metadata stored for the snapshots/snapshot portions matches the query/filter parameters. In one embodiment, query/filter parameter(s) may be query indexes (e.g., a query index such as "stop sign," multiple query indexes such as "stop sign" and "pedestrian crossing," etc.) that may be used to compare/match to index information stored for each snapshot or snapshot portion in order to determine whether one or more snapshots include a scene.

A determination is made in a step 1217 as to whether at least one snapshot (or snapshot portion, if applicable) has been identified for the scene based on the query or filter. That is, it is determined whether at least one snapshot includes index information that has been determined to substantially match the query or the filter for the scene. If it is determined that at least one snapshot has been identified, the data log arrangement provides the at least one identified data snapshot(s) or data snapshot portion(s) in a step 1221, and the method of identifying at least one scene in response to a query or a filter is completed. In one instance, providing an identified data snapshot can include returning a unique identifier for the data snapshot/snapshot portion (e.g., stored as metadata for the snapshot/snapshot portion), which can be used to obtain the data snapshot/snapshot portion, along with start and end time stamps of a matching window of time corresponding to data snapshot. For just a single scene (e.g., an instant/state of the world) or data snapshot/snapshot portion, as discussed herein for method 1205, the start time may be set to be equal to the end time, which is equal to the snapshot/snapshot portion time stamp. Alternatively, if it is determined that no data snapshots or data snapshot portions have been identified, then the data log arrangement provides an indication that no data snapshots or data snapshot portions were identified in a step 1225, and the method of identifying at least one scene in response to a query or a filter is completed.

Figure 13:
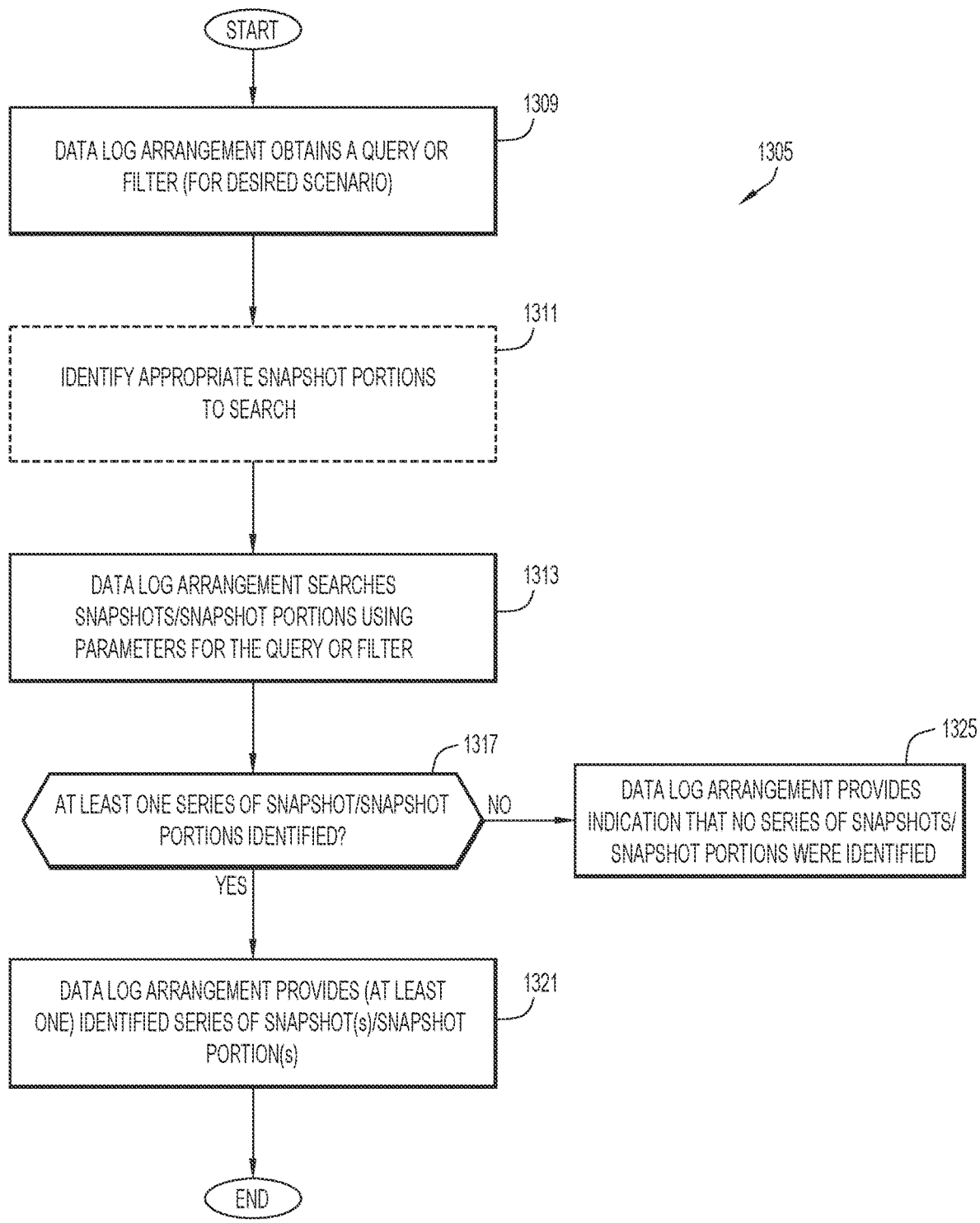
FIG. 13 is a process flow diagram which illustrates a method of utilizing indexable snapshots of data to identify at least one scenario that involves a range of time, e.g., a series of snapshots, in accordance with an embodiment.

FIG. 13 is a process flow diagram which illustrates a method 1305 of utilizing indexable data snapshots or data snapshot portions to identify at least one scenario which involves a range of time, e.g., a series of snapshots, in accordance with an embodiment. The method 1305 of identifying at least one scenario, or series of scenes, begins at a step 1309 in which a data log arrangement, e.g., system 1148 of FIG. 11, obtains a query or a filter. The query or filter, which may be obtained from a user, may specify one or more characteristics or qualities desired in a scenario.

In one embodiment, the query or filter may include a query/filter parameter specifying a threshold amount of time for a scenario (e.g., 20 seconds, a specific range of time including specific start/end times, etc.) in which the threshold amount of time can be correlated to snapshot time stamps in order to identify a series of snapshots (or snapshot portions) that correspond to the threshold amount of time. Thus, query/filter parameters may include any combination of index information and/or metadata.

In some embodiments, as shown at a step 1311, the method may include identifying appropriate snapshot portions to search based on the query or filter obtained. For example, if snapshots are stored in a synchronized data log in multiple snapshot portions, the query or filter may pertain only to a subset of the multiple snapshot portions. In such instances, the query or filter may identify: corresponding snapshot portion(s) that are to be searched, snapshot portions containing certain types of index information that are to be searched, snapshot portions containing index information for certain types of module(s) that are to be searched, any combinations and/or extensions thereof, and/or the like.

In a step 1313, the data log arrangement searches snapshots (or snapshot portions, if applicable) using parameters for the query or the filter. Such a search may generally include indexing into snapshots, determining of characteristics specified in the query or the filter substantially match characteristics stored as contextual information for the snapshots (or snapshot portions, if applicable), and determining whether a series of sequential snapshots (or snapshot portions, if applicable) matches characteristics specified in the query or the filter.

Stated differently, performing the querying/filtering may include parsing index information and/or metadata stored for snapshots or snapshot portions stored in a synchronized data log based on query/filter parameters included in the query/filter to determine whether any index information and/or metadata stored for the snapshots/snapshot portions matches the query/filter parameters. In one embodiment, query/filter parameters may be query indexes that may be used to compare/match to index information stored for each snapshot or snapshot portion.

In at least one embodiment, performing a query/filter in order to identify a given scenario may involve iterating over multiple snapshots or multiple snapshot portions of one or more series' using multiple queries/filters that collectively define the given scenario. For example, for a complex query such as, "vehicle slows down and drives around pedestrian," the querying may include: (1) identifying one or more series of snapshots in which the vehicle is slowing down; (2) determining, for any of the one or more series of snapshots identified in (1), whether at least one series of snapshots includes a pedestrian; and, finally (3) determining, for any of the one or more series of snapshots identified in (2), whether the vehicle drove around the pedestrian (e.g., as opposed to stopping).

It should be appreciated that any order of identification of index information and/or any other index information may be utilized to perform the example query; the example above is merely provided to illustrate that a query or filter may involve multiple iterations of analysis for one or more snapshots or snapshot portions and/or for one or more series of snapshots or snapshot portions. For example, complex queries can utilize pre-coded data types/indexes, routines, sub-routines, etc. that can iterate over single snapshots and/or sets or series of snapshots in order identify scenes and/or scenarios contained within snapshots.

A determination is made in a step 1317 as to whether at least one series of snapshots or snapshot portions has been identified. That is, it is determined whether at least one series of data snapshots or data snapshot portions has been determined to define a scenario that substantially matches parameters of the query or the filter.

If it is determined that at least one series of data snapshots or data snapshot portions has been identified, the data log arrangement provides the identified series of data snapshots or data snapshot portions in a step 1321, and the method of identifying at least one scenario in response to a query or a filter is completed. In one instance, providing an identified data snapshot can include returning unique identifiers for the data snapshots or snapshot portions (e.g., stored as metadata for the snapshot/snapshot portion), which can be used to obtain the data snapshots/snapshot portions, along with start and end time stamps of the matching range of time corresponding to scenario searched. Alternatively, if it is determined that no series of data snapshots or data snapshot portions has been identified, then the data log arrangement provides an indication that no series of data snapshots or data snapshot portions were identified in a step 1325, and the method of identifying at least one scenario in response to a query or a filter is completed.

Figure 14:
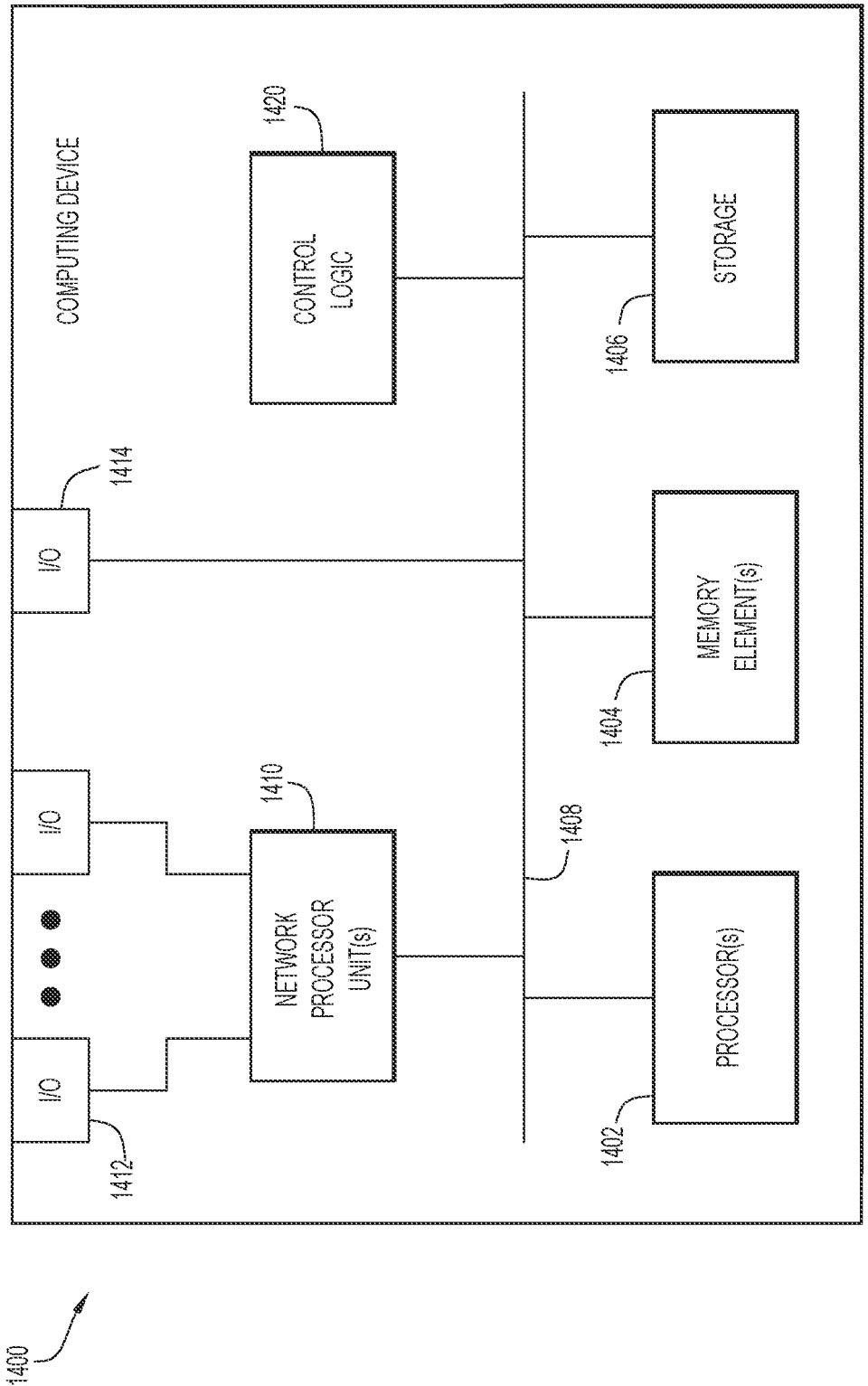
FIG. 14 is a hardware block diagram of a computing device for an autonomous vehicle that may perform functions associated with any combination of operations discussed for any techniques depicted herein.

FIG. 14 is a hardware block diagram of a computing device 1400 that may perform functions associated with any combination of operations discussed for any techniques depicted herein. In various example embodiments, a computing device or apparatus, such as computing device 1400 or any combination of computing devices 1400, may be configured as any entity/entities as discussed for the techniques depicted herein, such as a synchronization and processing arrangement (e.g., synchronization and processing arrangements 446, 446', and/or 546), a data log arrangement (e.g., data log arrangements 448, 448', and/or (system) 1148), and/or any other systems, modules, combinations thereof and/or the like that may be utilized to perform operations of the various techniques discussed herein.

In at least one embodiment, computing device 1400 may be any apparatus that may include one or more processor(s) 1402, one or more memory element(s) 1404, storage 1406, a bus 1408, one or more network processor unit(s) 1410 interconnected with one or more network input/output (I/O) interface(s) 1412, one or more I/O interface(s) 1414, and control logic 1420. In various embodiments, instructions associated with logic for computing device 1400 can overlap in any manner and are not limited to the specific allocation of instructions and/or operations described herein.

In at least one embodiment, processor(s) 1402 is/are at least one hardware processor configured to execute various tasks, operations and/or functions for computing device 1400 as described herein according to software and/or instructions configured for computing device. Processor(s) 1402 (e.g., hardware processor(s)) can execute any type of instructions associated with data to achieve the operations detailed herein. In one example, processor(s) 1402 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term "processor."

In at least one embodiment, memory element(s) 1404 and/or storage 1406 is/are configured to store data, information, software, and/or instructions associated with computing device 1400, and/or logic configured for memory element(s) 1404 and/or storage 1406. For example, any logic described herein (e.g., control logic 1420) can, in various embodiments, be stored for computing device 1400 using any combination of memory element(s) 1404 and/or storage 1406. Note that in some embodiments, storage 1406 can be consolidated with memory element(s) 1404 (or vice versa), or can overlap/exist in any other suitable manner.

In at least one embodiment, bus 1408 can be configured as an interface that enables one or more elements of computing device 1400 to communicate in order to exchange information and/or data. Bus 1408 can be implemented with any architecture designed for passing control, data and/or information between processors, memory elements/storage, peripheral devices, and/or any other hardware and/or software components that may be configured for computing device 1400. In at least one embodiment, bus 1408 may be implemented as a fast kernel-hosted interconnect, potentially using shared memory between processes (e.g., logic), which can enable efficient communication paths between the processes. In at least one embodiment, bus 1408 may be implemented as a Controller Area Network (CAN) bus.

In various embodiments, network processor unit(s) 1410 may enable communications (wired and/or wireless communications) between computing device 1400 and other systems, entities, etc. (e.g., for an autonomous vehicle), via network I/O interface(s) 1412 to facilitate operations discussed for various embodiments described herein. In various embodiments, network processor unit(s) 1410 can be configured as a combination of hardware and/or software, such as one or more Ethernet driver(s) and/or controller(s) or interface cards, wireless receivers/transmitters/transceivers, baseband processor(s)/modem(s), CAN driver(s) and/or controllers, optical driver(s) and/or controller(s), and/or other similar network interface driver(s) and/or controller(s) now known or hereafter developed to enable communications between computing device 1400 and other systems, entities, etc. to facilitate operations for various embodiments described herein. In various embodiments, network I/O interface(s) 1412 can be configured as one or more Ethernet port(s), CAN ports, and/or any other I/O port(s), and/or antennas/antenna array(s), now known or hereafter developed. Thus, the network processor unit(s) 1410 and/or network I/O interfaces 1412 may include suitable interfaces for receiving, transmitting, and/or otherwise communicating (in a wired and/or wireless manner) data and/or information in a network/vehicular environment.

I/O interface(s) 1414 allow for input and output of data and/or information with other entities that may be connected to computing device 1400. For example, I/O interface(s) 1414 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 1420 can include instructions that, when executed, cause processor(s) 1402 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 1420) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term "memory element." Data/information being tracked and/or sent to one or more entities as discussed herein could be provided in any database, table, register, list, cache, storage, and/or storage structure: all of which can be referenced at any suitable timeframe. Any such storage options may also be included within the broad term "memory element" as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software (potentially inclusive of object code and source code), etc.) for execution by one or more processor(s), and/or other similar machine, etc. Generally, memory element(s) 1404 and/or storage 1406 can store data, software, code, instructions (e.g., processor instructions), logic, parameters, combinations thereof, and/or the like used for operations described herein. This includes memory element(s) 1404 and/or storage 1406 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

The embodiments may be implemented as hardware, firmware, and/or software logic embodied in a tangible, i.e., non-transitory, medium that, when executed, is operable to perform the various methods and processes described above. That is, the logic may be embodied as physical arrangements, modules, or components. For example, the systems of an autonomous vehicle may include hardware, firmware, and/or software embodied on a tangible medium, which may be inclusive of a non-transitory tangible medium. A tangible medium may be substantially any computer-readable medium that is capable of storing logic or computer program code that may be executed, e.g., by a processor or an overall computing system, to perform methods and functions associated with the embodiments. Such computer-readable mediums may include, but are not limited to including, physical storage and/or memory devices. Executable logic may include, but is not limited to including, code devices, computer program code, and/or executable computer commands or instructions.

It should be appreciated that a computer-readable medium, or a machine-readable medium, may include transitory embodiments and/or non-transitory embodiments, e.g., signals or signals embodied in carrier waves. That is, a computer-readable medium may be associated with non-transitory tangible media and transitory propagating signals.

The steps associated with the methods of the present disclosure may vary widely. Steps may be added, removed, altered, combined, and reordered without departing from the spirit of the scope of the present disclosure. Therefore, the present examples are to be considered as illustrative and not restrictive, and the examples are not to be limited to the details given herein, but may be modified within the scope of the appended claims.

In one form, a method is provided comprising obtaining raw data from a plurality of data sources pertaining to operation of an autonomous vehicle, wherein the raw data is asynchronously obtained from the plurality of data sources; generating synchronized data by synchronizing the raw data asynchronously obtained from the plurality of data sources to a synchronization time; creating, based on the synchronized data, a data snapshot for the synchronization time, wherein the data snapshot created for the synchronization time comprises index information that identifies a world state for the autonomous vehicle and the raw data obtained from the plurality of data sources; and storing the data snapshot in a synchronized data log.

In one instance, generating the synchronized data further includes identifying index information contained within the raw data and/or generating index information based on the raw data.

The synchronization time can be a particular time to which the raw data obtained asynchronously from the plurality of data sources is synchronized or the synchronization time can be a particular period of time to which the raw data obtained asynchronously from the plurality of data sources is synchronized. The method can further include generating metadata for the data snapshot including a time stamp for the data snapshot in which the time stamp is associated with the particular time or the particular period of time.

In one instance, storing the data snapshot in the synchronized data log includes storing a full data snapshot comprising the index information and the raw data obtained for all of the plurality of data sources. In one instance, storing the data snapshot in the synchronized data log includes partitioning a full data snapshot into multiple snapshot portions, wherein each snapshot portion comprises a subset of the index information and a subset of the raw data obtained for a subset of the plurality of data sources.

The method may further include, based on additional raw data asynchronously obtained from the plurality of data sources, generating synchronized data by synchronizing the additional raw data asynchronously obtained from the plurality of data sources for a plurality of synchronization times, creating a plurality of data snapshots for the plurality of synchronization times, and storing the plurality of data snapshots in the synchronized data log. In one instance, each data snapshot is created using synchronized data generated for at least two synchronization times.

In one instance, the method can further include obtaining a query to identify a scene for one or more data snapshots of the plurality of data snapshots stored in the synchronized data log in which the query includes query parameters; searching index information for the plurality of data snapshots based on the query parameters to determine whether at least one data snapshot includes the scene; and upon determining at least one data snapshot including the scene, providing the at least one data snapshot to an apparatus. In one instance, the method can further include obtaining a query to identify a scenario for a series of data snapshots of the plurality of data snapshots stored in the synchronized data log, wherein the query includes query parameters; searching index information for the plurality of data snapshots to determine whether at least one series of data snapshots includes the scenario; and upon determining at least one series of data snapshots that includes the scenario, providing the at least one series of data snapshots to an apparatus.

Although only a few embodiments have been described in this disclosure, it should be understood that the disclosure may be embodied in many other specific forms without departing from the spirit or the scope of the present disclosure. By way of example, when a synchronization and processing arrangement is not onboard an autonomous vehicle, data has generally been described as being provided by the vehicle to the synchronization and processing arrangement using a wireless channel (e.g., wireless link 480). In one embodiment, the data may be provided to a synchronization and processing arrangement through a wired link, e.g., an Ethernet link that substantially communicably connects a vehicle with the synchronization and processing arrangement.

The contextual information stored with a snapshot of data may vary widely. Further, the contextual information may be obtained using any suitable method. In one embodiment, the metadata and/or indexes included in the contextual information may be substantially automatically obtained or otherwise derived from logs. In another embodiment, the metadata and/or indexes include information that is manually provided by an individual reviewing logs and/or data snapshots.

The level of detail provided by contextual information may vary, and may depend upon system requirements. By way of example, contextual information may specify substantially only the presence of a cross-street in a scene, contextual information may specify the name of the cross-street in the scene, and/or contextual information may specify the particular block of the cross-street in the scene.

The frequency with which snapshots are stored may vary widely depending, for instance, upon the granularity of data desired and/or an acceptable granularity of data. In general, increasing a number of snapshots generated and stored may reduce the amount of interpolation that may be needed to ascertain changes between consecutive snapshots. On the other hand, reducing a number of snapshots generated and stored may utilize less computational overhead, and storing fewer snapshots may be more practical and feasible than storing a relatively high number of snapshots. In one embodiment, snapshots which correspond to a sampling frequency of approximately 10 Hz, more than 10 Hz, or less than 10 Hz may be generated and stored. It should be appreciated, however, that the frequency of stored snapshots may vary without departing from the spirit or the scope of the disclosure.

In one embodiment, data may be partitioned such that a snapshot, or a world state record, may be stored as separate object files to reduce the amount of data to be read during query. Software used to perform queries may generally be written in any suitable language including, but not limited to including, Python.

An autonomous vehicle has generally been described as a land vehicle, or a vehicle that is arranged to be propelled or conveyed on land. It should be appreciated that in some embodiments, an autonomous vehicle may be configured for water travel, hover travel, and or/air travel without departing from the spirit or the scope of the present disclosure. In general, an autonomous vehicle may be any suitable transport apparatus that may operate in an unmanned, driverless, self-driving, self-directed, and/or computer-controlled manner.

Variations and Implementations

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
   obtaining raw data from a plurality of data sources pertaining to operation of an autonomous vehicle, wherein the raw data is asynchronously obtained from the plurality of data sources and the raw data includes planner data that describes a trajectory for the autonomous vehicle generated based on a surrounding environment and a position of the autonomous vehicle and control data that causes the autonomous vehicle to navigate along the trajectory;
   generating synchronized data by synchronizing the raw data asynchronously obtained from the plurality of data sources to a synchronization time;
   creating, based on the synchronized data, a data snapshot for the synchronization time, wherein the data snapshot created for the synchronization time comprises index information having contextual information that identifies a world state as perceived by the autonomous vehicle and the raw data obtained from the plurality of data sources; and
   storing the data snapshot in a synchronized data log.

2. The method of claim 1, wherein generating the synchronized data further comprises:
   identifying first index information contained within the raw data; and
   generating second index information based on the raw data.

3. The method of claim 1, wherein the synchronization time is a particular time to which the raw data obtained asynchronously from the plurality of data sources is synchronized or the synchronization time is a particular period of time to which the raw data obtained asynchronously from the plurality of data sources is synchronized.

4. The method of claim 3, further comprising generating metadata for the data snapshot including a time stamp for the data snapshot, wherein the time stamp is associated with the particular time or the particular period of time.

5. The method of claim 1, wherein storing the data snapshot in the synchronized data log includes storing a full data snapshot comprising the index information and the raw data obtained for all of the plurality of data sources.

6. The method of claim 1, wherein storing the data snapshot in the synchronized data log includes partitioning a full data snapshot into multiple snapshot portions, wherein each snapshot portion comprises a subset of the index information and a subset of the raw data obtained for a subset of the plurality of data sources.

7. The method of claim 1, further comprising:
   based on additional raw data asynchronously obtained from the plurality of data sources, generating the synchronized data by synchronizing the additional raw data asynchronously obtained from the plurality of data sources for a plurality of synchronization times, creating a plurality of data snapshots for the plurality of synchronization times, and storing the plurality of data snapshots in the synchronized data log.

8. The method of claim 7, wherein each data snapshot is created using the synchronized data generated for at least two synchronization times.

9. The method of claim 7, further comprising:
   obtaining a query to identify a scene for one or more data snapshots of the plurality of data snapshots stored in the synchronized data log, wherein the query includes query parameters;
   searching the index information for the plurality of data snapshots based on the query parameters to determine whether at least one data snapshot includes the scene; and
   upon determining at least one data snapshot including the scene, providing the at least one data snapshot to an apparatus.

10. The method of claim 7, further comprising:
    obtaining a query to identify a scenario for a series of data snapshots of the plurality of data snapshots stored in the synchronized data log, wherein the query includes query parameters;
    searching the index information for the plurality of data snapshots to determine whether at least one series of data snapshots includes the scenario; and
    upon determining at least one series of data snapshots that includes the scenario, providing the at least one series of data snapshots to an apparatus.

11. The method of claim 1, wherein generating the synchronized data includes:
    synchronizing the raw data, which is asynchronously obtained from the plurality of data sources during an operation of the autonomous vehicle, to the synchronization time using a sliding window, and wherein the data snapshot is partitioned into at least two separate object files.

12. The method of claim 1, wherein the index information identifies the state of the world and includes metadata describing one or more modules associated with the contextual information of the data snapshot from among the plurality of data sources, and further comprising:
  obtaining a query to identify a scenario for a series of data snapshots of a plurality of data snapshots stored in the synchronized data log,
  determining at least one module associated with the scenario based on the query;
  searching the index information for the plurality of data snapshots to determine whether at least one series of data snapshots includes the scenario, wherein the index information of a data snapshot that does not include the metadata describing the at least one module is skipped from searching; and
  based on determining that the at least one series of data snapshots includes the scenario, providing the at least one series of data snapshots.

13. One or more non-transitory computer readable storage media encoded with instructions that, when executed by a processor, cause the processor to perform operations, comprising:
  obtaining raw data from a plurality of data sources pertaining to operation of an autonomous vehicle, wherein the raw data is asynchronously obtained from the plurality of data sources and the raw data includes planner data that describes a trajectory for the autonomous vehicle generated based on a surrounding environment and a position of the autonomous vehicle and control data that causes the autonomous vehicle to navigate along the trajectory;
  generating synchronized data by synchronizing the raw data asynchronously obtained from the plurality of data sources to a synchronization time;
  creating, based on the synchronized data, a data snapshot for the synchronization time, wherein the data snapshot created for the synchronization time comprises index information having contextual information that identifies a world state as perceived by the autonomous vehicle and the raw data obtained from the plurality of data sources; and
  storing the data snapshot in a synchronized data log.

14. The media of claim 13, wherein generating the synchronized data further comprises:
  identifying first index information contained within the raw data; and
  generating second index information based on the raw data.

15. The media of claim 13, wherein the synchronization time is a particular time to which the raw data obtained asynchronously from the plurality of data sources is synchronized or the synchronization time is a particular period of time to which the raw data obtained asynchronously from the plurality of data sources is synchronized and the media further comprising instructions that, when executed by a processor, cause the processor to perform operations, comprising generating metadata for the data snapshot including a time stamp for the data snapshot, wherein the time stamp is associated with the particular time or the particular period of time.

16. The media of claim 13, wherein storing the data snapshot in the synchronized data log includes one of:
  storing a full data snapshot comprising the index information and the raw data obtained for all of the plurality of data sources; and
  partitioning a full data snapshot into multiple snapshot portions, wherein each snapshot portion comprises a subset of the index information and a subset of the raw data obtained for a subset of the plurality of data sources.

17. A system comprising:
  at least one memory element for storing data; and
  at least one processor for executing instructions associated with the data, wherein executing the instructions causes the system to perform operations, comprising:
    obtaining raw data from a plurality of data sources pertaining to operation of an autonomous vehicle, wherein the raw data is asynchronously obtained from the plurality of data sources and the raw data includes planner data that describes a trajectory for the autonomous vehicle generated based on a surrounding environment and a position of the autonomous vehicle and control data that causes the autonomous vehicle to navigate along the trajectory;
    generating synchronized data by synchronizing the raw data asynchronously obtained from the plurality of data sources to a synchronization time;
    creating, based on the synchronized data, a data snapshot for the synchronization time, wherein the data snapshot created for the synchronization time comprises index information having contextual information that identifies a world state as perceived by the autonomous vehicle and the raw data obtained from the plurality of data sources; and
    storing the data snapshot in a synchronized data log.

18. The system of claim 17, wherein generating the synchronized data further comprises:
  identifying first index information contained within the raw data; and
  generating second index information based on the raw data.

19. The system of claim 17, wherein the synchronization time is a particular time to which the raw data obtained asynchronously from the plurality of data sources is synchronized or the synchronization time is a particular period of time to which the raw data obtained asynchronously from the plurality of data sources is synchronized and wherein executing the instructions causes the system to perform further operations, comprising generating metadata for the data snapshot including a time stamp for the data snapshot, wherein the time stamp is associated with the particular time or the particular period of time.

20. The system of claim 17, wherein storing the data snapshot in the synchronized data log includes one of:
  storing a full data snapshot comprising the index information and the raw data obtained for all of the plurality of data sources; and
  partitioning a full data snapshot into multiple snapshot portions, wherein each snapshot portion comprises a subset of the index information and a subset of the raw data obtained for a subset of the plurality of data sources.

* * * * *